(12) United States Patent
Nakamura

(10) Patent No.: US 9,986,119 B2
(45) Date of Patent: May 29, 2018

(54) IMAGE PROCESSING APPARATUS FOR SHARING SETTING VALUE, METHOD OF CONTROLLING THE SAME, AND STORAGE MEDIUM

(71) Applicant: CANON KABUSHIKI KAISHA, Tokyo (JP)

(72) Inventor: Shun Nakamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/411,552

(22) Filed: Jan. 20, 2017

(65) Prior Publication Data

US 2017/0223209 A1    Aug. 3, 2017

(30) Foreign Application Priority Data

Jan. 28, 2016 (JP) ................. 2016-014539

(51) Int. Cl.
*G06F 3/12* (2006.01)
*H04N 1/00* (2006.01)

(52) U.S. Cl.
CPC ..... *H04N 1/00973* (2013.01); *H04N 1/00344* (2013.01); *H04N 1/00347* (2013.01); *H04N 1/00931* (2013.01); *H04N 2201/0094* (2013.01)

(58) Field of Classification Search
None
See application file for complete search history.

(56) References Cited

U.S. PATENT DOCUMENTS

| 7,017,071 | B2 | 3/2006 | Katayama et al. |
| 7,287,073 | B2 | 10/2007 | Katayama et al. |
| 8,988,712 | B2 | 3/2015 | Nakamura ................ 358/1.15 |
| 2012/0127525 | A1* | 5/2012 | Uchibori ............ G06F 3/1204 358/1.15 |
| 2015/0189116 | A1* | 7/2015 | Ito ..................... H04N 1/00973 358/1.13 |
| 2016/0036631 | A1* | 2/2016 | Shibata .............. H04L 67/1095 709/221 |

FOREIGN PATENT DOCUMENTS

JP    2013-001044    1/2013

* cited by examiner

*Primary Examiner* — Henok A Shiferaw
(74) *Attorney, Agent, or Firm* — Fitzpatrick, Cella, Harper & Scinto

(57) ABSTRACT

An image processing apparatus inquires to an external apparatus for information as to whether or not a first database relating to setting items of the image processing apparatus exists, when initially connecting to the network; obtains setting values of the first database when it is confirmed that the first database exists; and reflects the obtained setting values to a second database held in the image processing apparatus and requests to the external apparatus to update information of the first database with the reflected setting values of the second database.

9 Claims, 17 Drawing Sheets

IMAGE PROCESSING APPARATUS FOR SHARING SETTING VALUE, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

In recent years, regarding setting values of an information processing apparatus such as a multi-function peripheral, master data is saved to another information processing apparatus such as a network connected server and comprehensively managed. These values are synchronized and when the values of the master data on the server are changed, the values after the change are notified to one or more network connected multi-function peripherals and the setting values of the multi-function peripherals are also changed. Similarly, when the setting values within the multi-function peripherals are changed, the values of the master data on the server are also changed.

There are setting values that are synchronized between a plurality of multi-function peripherals, and when such setting values are changed on one multi-function peripheral, the values of the master data on the server and the setting values for all the multi-function peripherals that are targets of the synchronization are changed. However, there are information processing apparatus setting values that are provided to perform internal processing during the operation of the information processing apparatus, and setting values that are meaningful in only one individual information processing apparatus, and that are not meaningful in the other information processing apparatus with which the synchronization is performed. Japanese Patent Laid-Open No. 2013-001044, for example, proposes a synchronization method for data between an information processing apparatus and a setting value management server.

However, there is a problem as is recited below with the foregoing conventional technique. In the above described conventional technique, selecting setting values to be distributed from a server to a client information processing apparatus for synchronization is enabled by setting in advance, on a server, information as to what setting values can be edited and what setting values cannot be edited on the server. In this way, the setting values that cannot be edited on the server are not synchronized with the client information processing apparatus. However, there may also exist setting values that the information processing apparatus has for which synchronization of the values between the server and the client becomes necessary from the perspective of comprehensive management of the setting values, even though it is necessary to make them uneditable on the server. In other words, in the above described conventional technique, it is not possible to flexibly associate setting values as described above because it is set whether or not they are editable on the server.

SUMMARY OF THE INVENTION

The present invention enables realization of a mechanism for suitably synchronizing every setting value between a server and a client and resolving inconsistencies that have occurred at a time of a reconnection separately from an existence or absence of an editing of each setting value.

One aspect of the present invention provides an image processing apparatus capable of communication with an external apparatus that manages setting items of a plurality of image processing apparatuses connected to a network, the image processing apparatus comprising: a memory device that stores a set of instructions; and at least one processor that executes the instructions to: inquire to the external apparatus for information as to whether or not a first database relating to setting items of the image processing apparatus exists in the external apparatus, in a case where an initial connection between the image processing apparatus and the external apparatus is performed via the network; obtain setting values of the first database in a case where it is determined based on a result of the inquiry that the first database exists in the external apparatus; reflect the obtained setting values to a second database held in the image processing apparatus and request to the external apparatus to update or replace information of the first database held in the external apparatus with the reflected setting values of the second database held in the image processing apparatus, and make, in a case where it is determined based on a result of the inquiry that the first database does not exist in the external apparatus, a request to the external apparatus to newly generate the first database with setting values of the second database held in the image processing apparatus, wherein the setting items include first setting items that can be edited in the external apparatus and second setting items that cannot be edited in the external apparatus.

Another aspect of the present invention provides a method of controlling an image processing apparatus capable of communication with an external apparatus that manages setting items of a plurality of image processing apparatuses connected to a network, the method comprising: inquiring to the external apparatus for information as to whether or not a first database relating to setting items of the image processing apparatus exists in the external apparatus, in a case where an initial connection between the image processing apparatus and the external apparatus is performed via the network; obtaining setting values of the first database in a case where it is determined based on a result of the inquiry that the first database exists; reflecting the obtained setting values to a second database held in the image processing apparatus and request to the external apparatus to update or replace information of the first database held in the external apparatus with the reflected setting values of the second database held in the image processing apparatus, and making, in a case where it is determined based on a result of the inquiry that the first database does not exist in the external apparatus, a request to the external apparatus to newly generate the first database with setting values of the second database held in the image processing apparatus, wherein the setting items include first setting items that can be edited in the external apparatus and second setting items that cannot be edited in the external apparatus.

Still another aspect of the present invention provides a non-transitory computer-readable storage medium storing a computer program for causing a computer to execute a method of controlling an image processing apparatus capable of communication with an external apparatus that manages setting items of a plurality of image processing apparatuses connected to a network, the method comprising: inquiring to the external apparatus for information as to whether or not a first database relating to setting items of the image processing apparatus exists in the external apparatus, in a case where an initial connection between the image processing apparatus and external apparatus is performed via the network; obtaining setting values of the first database in a case where it is determined based on a result of the inquiry that the first database exists; reflecting the obtained setting values to a second database held in the image processing apparatus and request to the external apparatus to update or replace information of the first database held in the external apparatus with the reflected setting values of the second database held in the image processing apparatus, and making, in a case where it is determined based on a result of the inquiry that the first database does not exist in the external apparatus, a request to the external apparatus to newly generate the first database with setting values of the second database held in the image processing apparatus, wherein the setting items include first setting items that can be edited in the external apparatus and second setting items that cannot be edited in the external apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Definition of terms hereinafter, if not identified specifically, are applied throughout the scope of the present specification and the patent claims. "Setting value", is made to encompass not only a value for controlling an operation of an information processing apparatus thereby, but also a value for referencing an internal configuration of a multi-function peripheral (image processing apparatus) or an operation state of a multi-function peripheral for management purposes. "Synchronized" means a state in which identical values are set for every setting value between a setting value DB (database) that an image processing apparatus which is a client manages and a setting value DB corresponding to the image processing apparatus that an information processing apparatus (external apparatus) that is a server manages. Accordingly, this is distinguished from cases in which values of a setting value DB that are set to be the same between a plurality of image processing apparatuses via the server.

"Initial connection" means a communication procedure which is first performed between two parties after the image processing apparatus that is the client transitions from a state in which it is not synchronized with the information processing apparatus that is the server to a state in which synchronization starts. By the performance of the initial connection, it becomes possible to perform synchronization of the setting value DB between the client and the server and to start a static synchronous state between both parties. Accordingly, even in a case where the client and the server were synchronized in the past, the initial connection is once again executed when thereafter the synchronous state is once cancelled, and then the synchronous state is transitioned into once again.

"Replacement" means handing over the setting values of an image processing apparatus to a new image processing apparatus and causing it to operate in a case where it becomes necessary to switch from an image processing apparatus that is synchronized with the server as the client to another image processing apparatus for any reason such as a deterioration or a malfunction. An initial connection is performed between the new image processing apparatus and the server when handing over the setting values.

First Embodiment

<Configuration of Setting Value Synchronization System>

Figure 1:
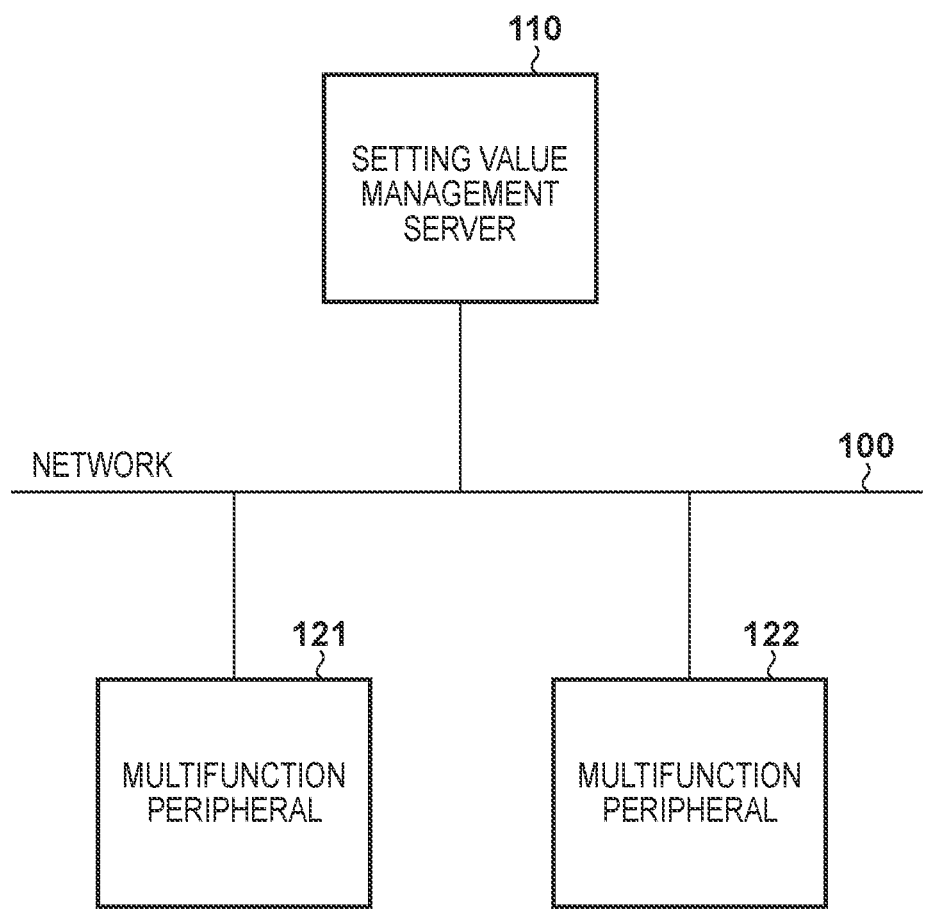
FIG. 1 is a system configuration diagram illustrating an entire setting value synchronization system according to an embodiment.

Below, explanation will be given for a first embodiment of the present invention. Firstly, description will be given regarding an example of a configuration of a setting value synchronization system according to embodiments with reference to FIG. 1. A setting value management server (external apparatus) 110 and multi-function peripherals (image processing apparatuses) 121 and 122 are communicably connected to a network 100.

The setting value management server 110 manages setting value master data of the multi-function peripheral 121 and the multi-function peripheral 122. In a case where there was a change in the master data, change information is notified to the multi-function peripheral 121 and the multi-function peripheral 122 via the network 100. Also, values of the master data itself are changed when change information of the setting values is received from the multi-function peripheral 121 and the multi-function peripheral 122.

The multi-function peripheral 121 is a device for realizing a plurality of types of functions such as copy or fax for example, and records internally the setting values to be used at a time of an execution of these functions. If there is a change to the setting values, change information is communicated to the setting value management server 110 via the network 100. Also, the setting values themselves are changed when change information of the setting value master data is received from the setting value management server 110. Note, there may be setting values for which synchronization of the values between a plurality of multi-function peripherals such as between the multi-function peripheral 121 and the multi-function peripheral 122 is performed. Regarding these setting values, change information of the setting values is notified to both the multi-function peripheral 121 and the multi-function peripheral 122 in a case where there is a change in the master data on the setting value management server 110. Also, firstly the change information is notified to the setting value management server 110 in a case where there is a change in the setting values of either the multi-function peripheral 121 and the multi-function peripheral 122, and after that, the change information is notified to the other multi-function peripheral via the setting value management server 110. A detailed description will be given later regarding the setting value management server 110 and the multi-function peripheral 121.

<Setting Value Management Server Configuration>

Figure 2:
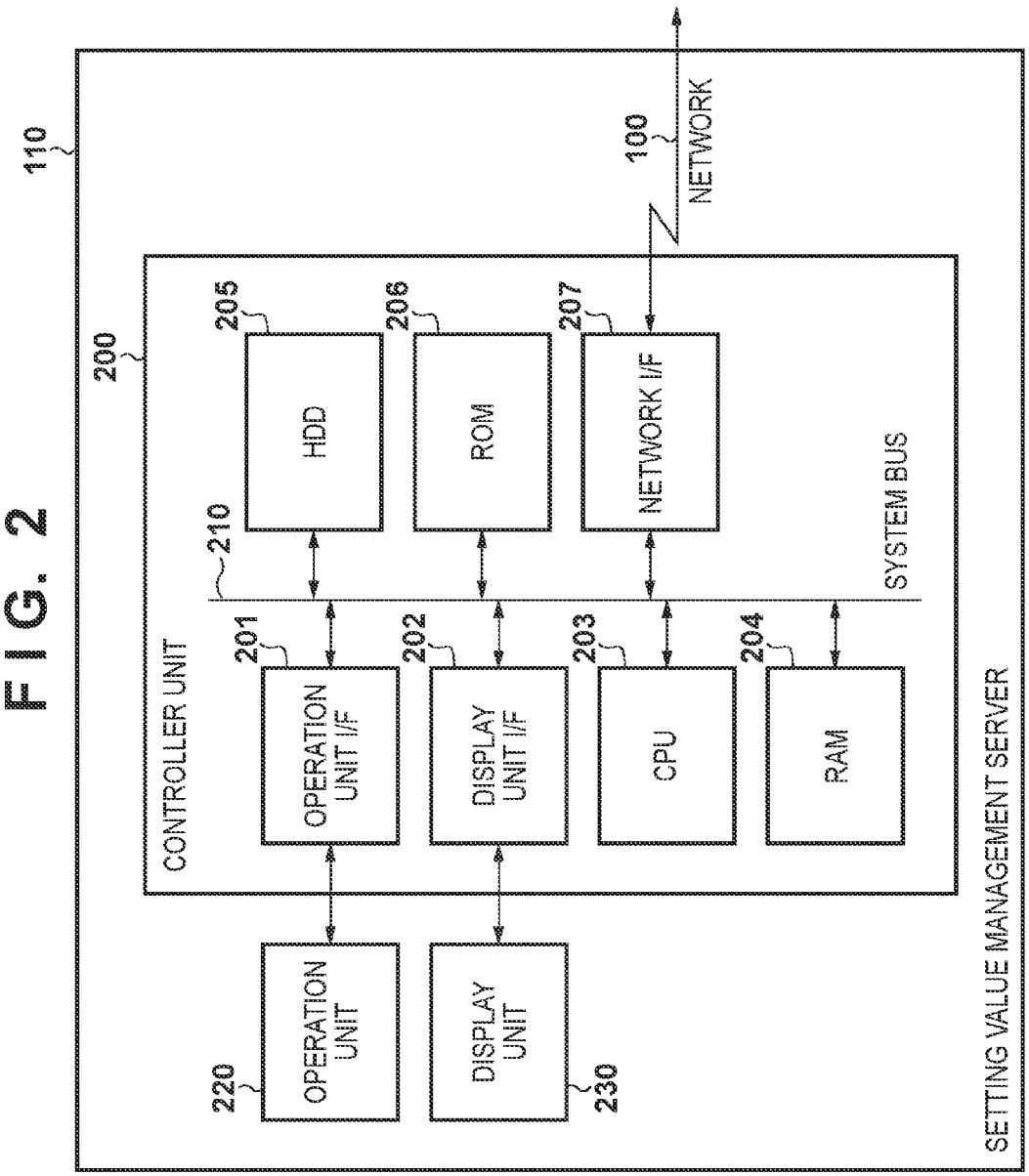
FIG. 2 is a block diagram illustrating a configuration of a setting value management server 110 according to an embodiment.

Next, description will be given regarding a configuration of the setting value management server 110 in the present embodiment with reference to FIG. 2. The setting value management server 110 is configured to include a controller unit 200, an operation unit 220, and a display unit 230.

The controller unit 200 has a CPU (Central Processing Unit) 203. The CPU 203 activates an OS (Operating System) by a boot program stored in a ROM (Read Only Memory) 206. The CPU 203, through the OS, executes application programs stored in the HDD (Hard Disk Drive) 205, and thereby executes various processing. The RAM (Random Access Memory) 204 is used as a work area for the CPU 203.

An HDD 205 stores setting value master data of the multi-function peripheral 121, the application programs described above, and the like. Detail regarding a management approach for the master data is described later. An operation unit I/F 201, a display unit I/F 202, and a network I/F 207 along with the ROM 206 and the RAM 204 are connected to the CPU 203 via a system bus 210. The operation unit I/F 201 is an interface for the operation unit 220, which comprises a mouse, a keyboard, or the like, and the operation unit I/F 201 sends information, input by a user through the operation unit 220, to the CPU 203. The display unit I/F 202 outputs image data to be displayed on the display unit 230, which comprises a display or the like, to the display unit 230. The network I/F 207 is connected to the network 100, and performs input/output of information with each apparatus on the network 100 via the network 100.

<Multi-Function Peripheral Configuration>

Figure 3:
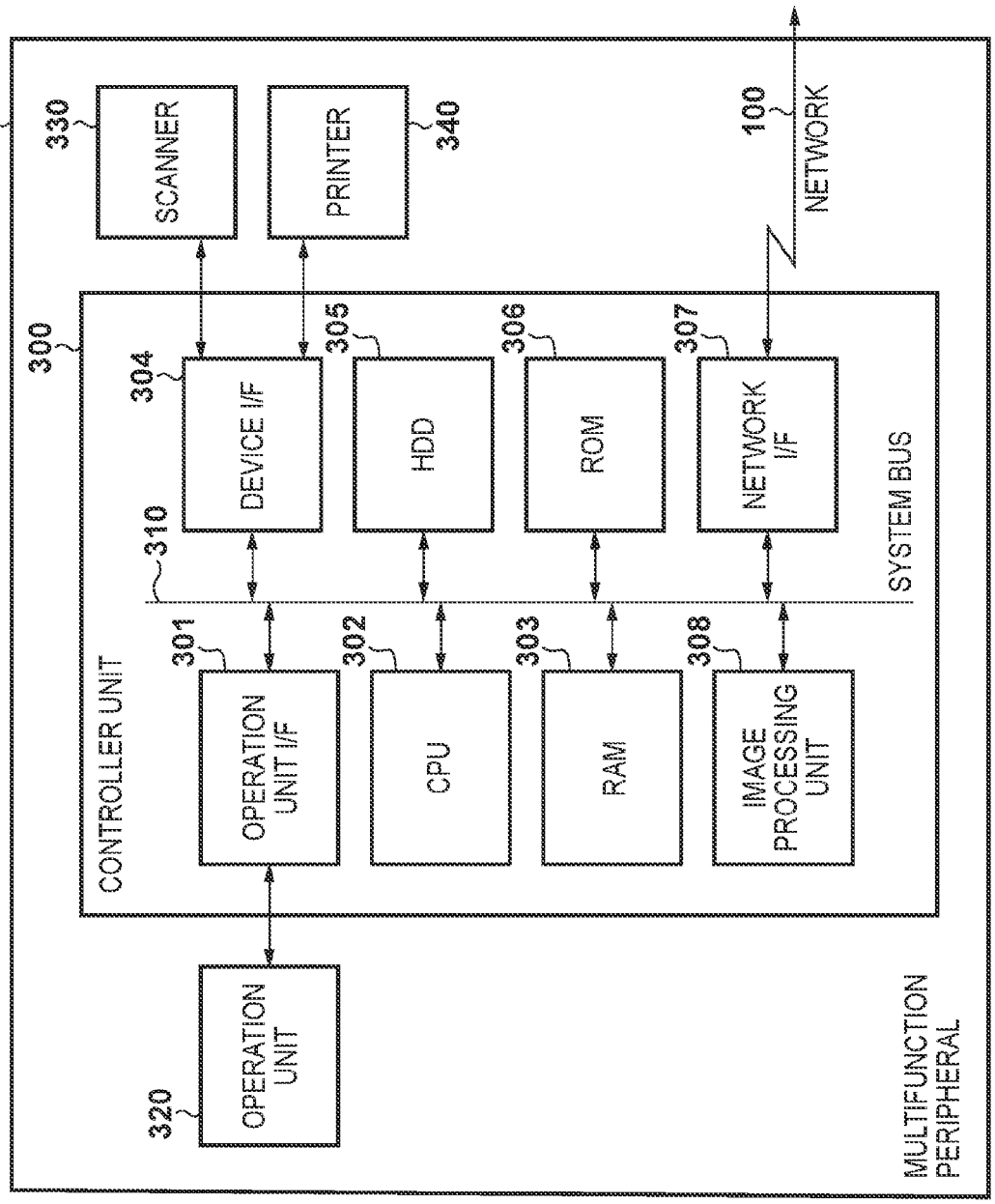
FIG. 3 is a block diagram illustrating a configuration of a multi-function peripheral 121 according to an embodiment.

Next, description will be given regarding a configuration of the multi-function peripheral (image processing apparatus) 121 according to embodiments with reference to FIG. 3. The multi-function peripheral 121 is configured to include a controller unit 300, an operation unit 320, a scanner 330, and a printer 340. The controller unit 300 is connected to the operation unit 320, and is also connected to the scanner 330, which is an image input device, and the printer 340, which is an image output device.

The controller unit 300 has a CPU 302. The CPU 302 activates an OS by a boot program stored in a ROM 306. The CPU 302, through the OS, executes application programs stored in a HDD 305, and thereby executes various processing. A RAM 303 is used as a work area of the CPU 302. The RAM 303 provides a work area and also provides an image memory region for temporarily recording image data. The HDD 305 stores the above-described the application programs, the image data, and various settings values. Description is given later regarding a management method of the setting values in the multi-function peripheral 121.

Furthermore, an operation unit I/F 301, a device I/F 304, a network I/F 307, and an image processing unit 308 as well as the ROM 306 and the RAM 303, are connected to the CPU 302 via a system bus 310. The operation unit I/F 301 is an interface for the operation unit 320 which has a touch panel, and outputs image data to be displayed on the operation unit 320 to the operation unit 320. The operation unit I/F 301 sends information input by the user to the CPU 302 by the operation unit 320. The scanner 330 and the printer 340 are connected to the device I/F 304, and the device I/F 304 performs conversion between a synchronous system/asynchronous system for the image data. The network I/F 307 is connected to the network 100, and performs input/output of information with each apparatus on the network 100 via the network 100. In the image processing unit 308, processing of output image processing, image rotation, image compression, resolution conversion, color space conversion, tone conversion, and the like are performed from the scanner 330 to input image processing or the printer 340.

<Master Data Configuration>

Figure 4:
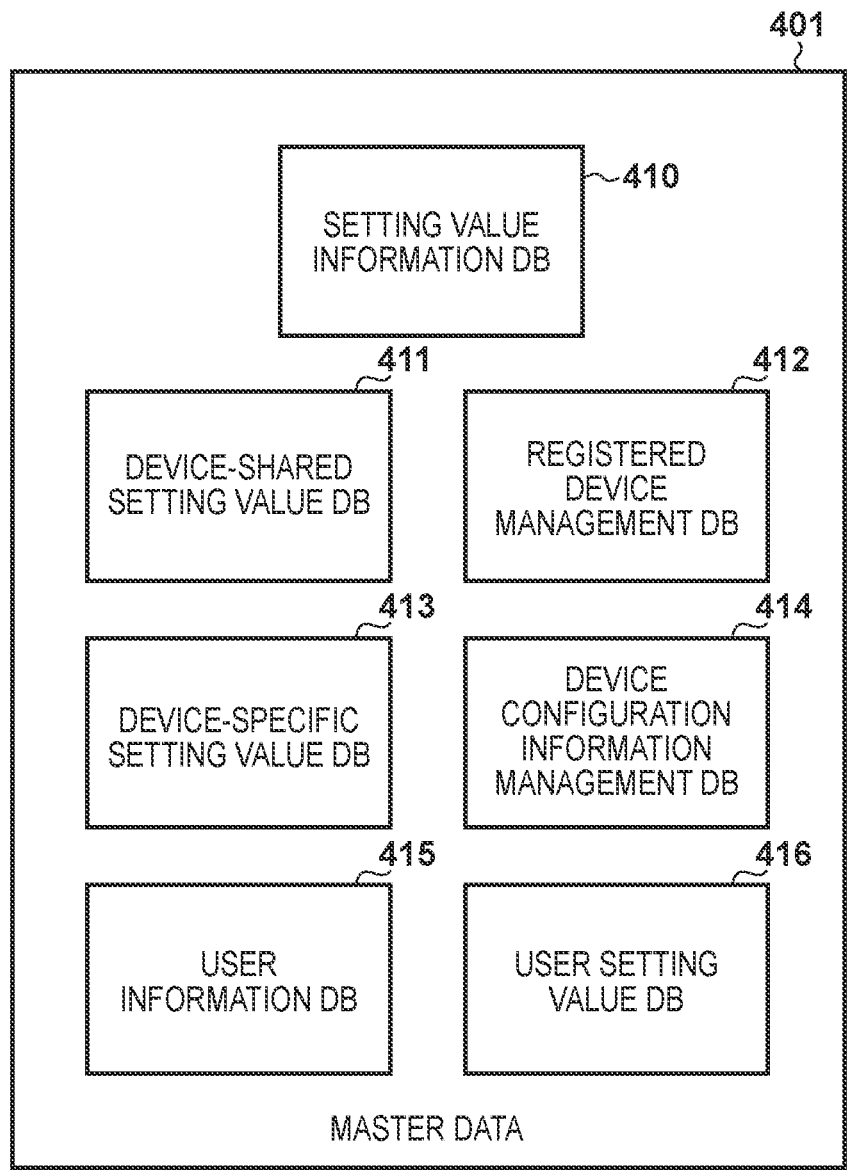
FIG. 4 is a block diagram illustrating a configuration of master data managed in the setting value management server 110 according to an embodiment.

Next, description will be given regarding a configuration of the master data managed by the setting value management server 110 in the present invention with reference to FIG. 4. Master data 401 is a first database and includes a setting value information database (hereinafter abbreviated as DB) 410. Furthermore, the master data 401 is configured from a device-shared setting value DB 411, a registered device management DB 412, a device-specific setting value DB 413, a device configuration information management DB 414, a user information DB 415, and a user setting value DB 416. An example of data stored in the setting value information DB 410 is indicated in Table 1.

TABLE 1

| key identifier | UI display text | initial value | value range | applicable model/ firmware version | display condition | management classification |
|---|---|---|---|---|---|---|
| settings.pattern | pattern print | 0 | 0-1 | model A/ALL model B/ ALL model C/V3.01 or greater | pattern license | edit/reference |
| settings.density | print density | 5 | 0-10 | model A/ALL model B/ 2.01 or greater | — | edit/reference |
| settings.density | print density | 3 | 0-6 | model B/1.99 or prior model C/ALL | — | edit/reference |
| settings.device_serial | serial ID | " | character string | ALL | — | reference only |
| settings.sleep_time | sleep time | 0 | 0-14400 | ALL | — | edit/reference |
| settings.dns_address | DNS server address | " | character string | ALL | — | edit/reference |
| settings.notice.device_state | device driving state | 0 | 0-10 | ALL | — | reference only |
| ... | | | | | | |

The setting value information DB 410 is a database in which metadata relating to each setting value managed in the setting value management server 110 is stored. In the setting value information DB 410, text (UI display text) for when presentation is made to a user and key identifiers for identifying setting values, initial values, value ranges, suitable model/firmware versions, display conditions of setting values, and management classifications are stored when communication with the multi-function peripheral 121 is performed. Each setting value managed through the setting value information DB 410 depends on a model or a firmware version of the multi-function peripheral 121, and may differ in information such as setting value range, initial value, information as to whether the setting value exists, or the like.

In Table 1, it is indicated that a setting value represented by a key identifier "settings.pattern" exists for all individuals of model A and model B, but only exists for individuals of model C whose firmware version is 3.01 or greater. Also, it is indicated that for a setting value represented by a key identifier "settings.density", an initial value and a value range of a setting value differs depending on the firmware version installed in model B. For the setting value following "settings.density" indicated in Table 1, it is indicated that applicable models is "ALL" and it is of the same value range and initial value irrespective of the model and the firmware version.

Also, in the management classification, information indicating how each setting value is to be managed is managed. In the information indicating the management classification, two types exist: "edit/reference" and "reference only". "Edit/reference" indicates an item that a user on the setting value management server 110 can edit and can reference. Meanwhile, "reference only" indicates an item that a user on the setting value management server 110 cannot edit but can reference. A setting value of "edit/reference" indicates that it is reflected to the server 110 in a case where the corresponding setting value on the multi-function peripheral 121 is edited, and that it is reflected in the multi-function peripheral 121 in a case where it is edited on the server 110. Meanwhile, a setting value of "reference only" is only reflected in the server 110 in a case where it is changed on the multi-function peripheral 121 because it cannot be changed on the server 110.

For example, for a setting value indicated by a key identifier "settings.device_serial" and "settings.notice.device_state", the management classification is "reference only". "settings.device_serial" is a setting value indicating a serial ID of the multi-function peripheral 121. Accordingly, "reference only" is set as an appropriate management classification because it would be meaningless even if it could be edited from the setting value management server 110. For this setting value, the values on the setting value management server 110 are updated in conjunction with an update request from a multi-function peripheral after a replacement in accordance with a processing procedure of the present invention described later in a case where replacing the multi-function peripheral 121 with another multi-function peripheral that is not illustrated for example.

Also, "settings.notice.device_state" is a setting value indicating an operation state of the multi-function peripheral 121 at that point in time. Accordingly, "reference only" is set as an appropriate management classification because it would be meaningless even if it could be edited from the setting value management server 110. For example, this setting value on the setting value management server 110 is updated in conjunction with an update request from the multi-function peripheral 121 in a case where a change arises in the multi-function peripheral 121 such as a case where the multi-function peripheral 121 transitions from normal operation (the value is made to be 0) to a printer error state (the value is made to be 1). Among setting values whose management classification is "reference only", there are those for which although it would be meaningless even if they could be edited from the setting value management server 110 as described above, it is useful for multi-function peripheral management to be able to reference them.

Table 2 indicates data stored in the device-shared setting value DB 411. The device-shared setting value DB 411 is a database that manages setting values that are synchronized by sharing the values in all of the plurality of the multi-function peripheral 121 and 122 for which setting values are managed by the setting value management server 110. The device-shared setting value DB 411 stores key identifiers, values corresponding to identifiers, a last update date and time of the setting values, and management classifications. This key identifier is an identifier which has the same system as the key identifier of the setting value information DB 410.

TABLE 2

| key identifier | value | last update date and time | management classification |
|---|---|---|---|
| settings.pattern | 1 | 2013 May 9/18:42 | edit/reference |
| settings.density | 0 | 2013 Sep. 9/12:01 | edit/reference |
| settings.sellp_time | 3600 | 2013 Sep. 8/17:35 | edit/reference |

TABLE 2-continued

| key identifier | value | last update date and time | management classification |
|---|---|---|---|
| settings.dns_address | "xxx.xxx.xxx.xxx" | 2013 Jun. 18/17:43 | edit/reference |
| ... | | | |

Table 3 indicates data stored in the device-specific setting value DB 413. The device-specific setting value DB 413 is a database that manages setting values whose values differ in each of the plurality of the multi-function peripheral 121 and 122 for which setting values are managed by the setting value management server 110. Note, a plurality of the device-specific setting value DB 413 exist corresponding to individual multi-function peripherals and are linked by making individual identifiers of the multi-function peripheral stored in the device configuration information management DB 414 described later be metadata in the DB corresponding to each multi-function peripheral. The device-specific setting value DB 413 stores key identifiers, values corresponding to identifiers, a last update date and time of the setting values, and management classifications. This key identifier is an identifier which has the same system as the key identifier of the setting value information DB 410. Also the setting value for which the management classification is "reference only" is stored in the device-specific setting value DB 413.

TABLE 3

| key identifier | value | last update date and time | management classification |
|---|---|---|---|
| settings.device_serial | "WXYZ12ABC" | 2013 Jun. 18/ 17:12 | reference only |
| settings.copy_cur_page | 66 | 2013 Sep. 9/ 13:25 | reference only |
| settings.notice.device_state | 0 | 2013 Jun. 18/ 16:28 | reference only |
| ... | | | |

Table 4 indicates contents of device configuration information of every individual multi-function peripheral managed by the device configuration information management DB 414. The device configuration information management DB 414 is a database for storing and managing a plurality of device configuration information items. The device configuration information includes an individual identifier for identifying an individual of the multi-function peripheral 121, a model name, a firmware version, license information indicating functions that can be used, and the like. Note, the model name, the firmware version, the license, and the like have the same system as those stored in the setting value information DB 410.

TABLE 4

| attribute | value |
|---|---|
| device identifier | device 1 |
| model name | model A |
| firmware version | 0.01 |
| installed license | pattern license |
| accessory | Finisher-X |

The registered device management DB 412 is a database for managing individual identifiers of the multi-function peripheral 121 individuals whose setting values are managed in the setting value management server 110. In other words, it is a database for managing information only of individual identifiers of respective devices managed in the device configuration information management DB 414.

Table 5 indicates data stored the user information DB 415. The user information DB 415 is a database for managing information relating to users who use the multi-function peripheral 121. In the user information DB 415, user IDs for uniquely identifying users, user names that users input at a time of a login, and the like are stored.

TABLE 5

| user ID | user name | First name | Last name |
|---|---|---|---|
| 501 | sato | Takashi | Sato |
| 502 | ii | Ryoko | Ii |
| ... | | | |

Table 6 indicates data stored the user setting value DB 416. The user setting value DB 416 is a database for managing setting values for each user who can use the multi-function peripheral 121. In the user setting value DB 416, user IDs for uniquely identifying users, key identifiers for uniquely identifying setting values, contents of the setting values, and the last update date and time of the setting values are stored. Note, the user ID is the same as in the user information DB 415.

The setting value management server 110 is capable of using each database of the master data 401 as described above and collectively managing setting values differing in the respective management target multi-function peripherals 121, setting values common to every management target multi-function peripheral, and metadata about the respective setting values themselves.

TABLE 6

| user ID | key identifier | value | last update date and time |
|---|---|---|---|
| 501 | preference.print_setting1 | {colormode: "BW", copies: "3"} | 2013 Feb. 4/ 2:01 |
| 501 | preference.print_setting2 | {colormode: "CL", quality: "low"} | 2013 Feb. 3/ 7:35 |
| 501 | preference.address1 | {destination: "sato@canon.com"} | 2013 Aug. 30/ 3:01 |
| 501 | preference.address2 | {destination: "user1@canon.com"} | 2013 Jan. 13/ 2:16 |
| ... | | | |

Table 7 indicates one example of a configuration of a described later setting value DB 511 which is stored in the HDD 305 of the multi-function peripheral 121 according to the embodiment. The setting value DB 511 is a database for storing setting values used in the multi-function peripheral 121. The setting values stored in the setting value DB 511 are configured from elements such as key identifiers for identifying the setting values, the values of the setting values, and management classifications. In cases when the setting values in the setting value management server 110 or the multi-function peripheral 121 are changed, the setting values are synchronized by communicating at least key identifiers and values among the data indicated in Table 7.

TABLE 7

| key identifier | value | management classification |
|---|---|---|
| settings.pattern | 0 | edit/reference |
| settings.density | 0 | edit/reference |
| settings.sleep_time | 100 | edit/reference |
| settings.dns_address | "xxx.xxx.xxx.xxx" | edit/reference |
| settings.device_serial | "WXYZ12ABC" | reference only |
| settings.copy_cur_page | 66 | reference only |
| settings.notice.device_state | 0 | reference only |
| ... | | |

Also, although not illustrated here, configuration of a setting value information DB 512 stored in the HDD 305 of the multi-function peripheral 121 is something that comprises the same format as the setting value information DB 410 indicated in Table 1. Synchronization processing of each of the setting values is performed by the network I/F 207 of the setting value management server 110 and the network I/F 307 of the multi-function peripheral 121 communicating via the network 100.

<Setting Value Management Application (Client)>

Figure 5:
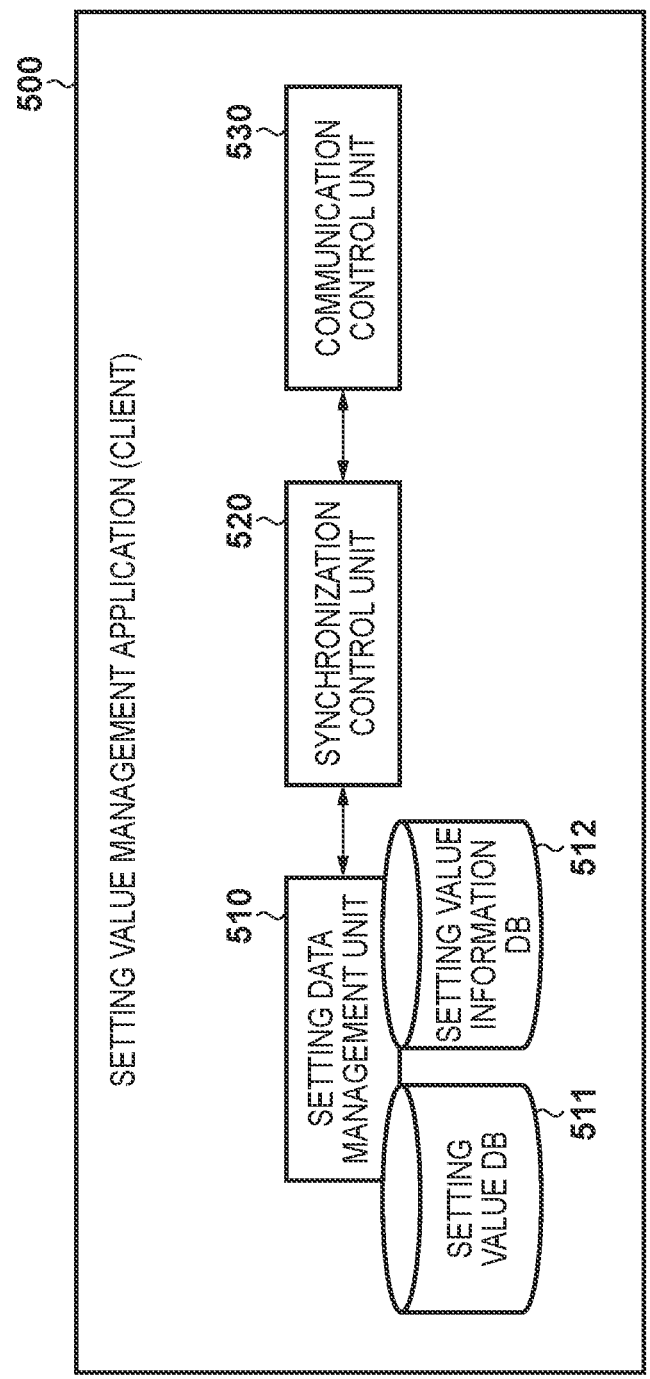
FIG. 5 is a software configuration of the multi-function peripheral 121 in the setting value synchronization system according to an embodiment.

Description will be given regarding an example of a software configuration of a setting value management application which operates in the multi-function peripheral 121 which is a client in the synchronization system according to embodiments with reference to FIG. 5. A setting value management application 500 is configured from a setting data management unit 510, a synchronization control unit 520, and a communication control unit 530. The setting data management unit 510 manages the setting data of the multi-function peripheral 121. The synchronization control unit 520 performs control relating to a synchronization between the setting value management server 110 and the setting data of the multi-function peripherals 121 that are managed by the setting data management unit 510. The communication control unit 530 performs control of communication performed via the network I/F 307.

The setting value management application 500 is recorded to a storage unit of one of the RAM 303, the HDD 305, and the ROM 306 and is executed by the CPU 302 in the present specification. Also, the setting value DB 511 which is a second database that the setting data management unit 510 manages and the setting value information DB 512 is saved in the HDD 305, the RAM 303, the ROM 306, or the like.

The setting data management unit 510, in a case where the communication control unit 530 obtains the setting value update information from the setting value management server 110, receives the update information through the synchronization control unit 520 and performs processing which causes it to be reflected in the setting value DB 511 managed by itself. Also, the setting data management unit 510 makes a notification of the setting value information comprising some or all of the items of the setting value DB 511 to the synchronization control unit 520 in a case where information of the setting value DB 511 is updated in the multi-function peripheral 121 or in a case where an obtainment request for the setting value information is received from the synchronization control unit 520.

The synchronization control unit 520 controls processing for synchronization of setting values with the setting value management server 110. Specifically, it generates data for making a request for a synchronization to the setting value management server 110 from setting value data received from the setting data management unit 510 and makes a request for an execution of a synchronization communication to the communication control unit 530. Also, it receives update information of the device-specific setting value DB 413 corresponding the multi-function peripheral 121 that the communication control unit 530 received from the setting value management server 110 and makes a request to the setting data management unit 510 for a reflection to the setting value DB 511.

The communication control unit 530 executes processing for communication with the setting value management server 110. Also, it receives update information of the master data 401 obtained by the setting value management server and transmits this to the synchronization control unit 520.

<Setting Value Management Application (Server)>

Figure 6:
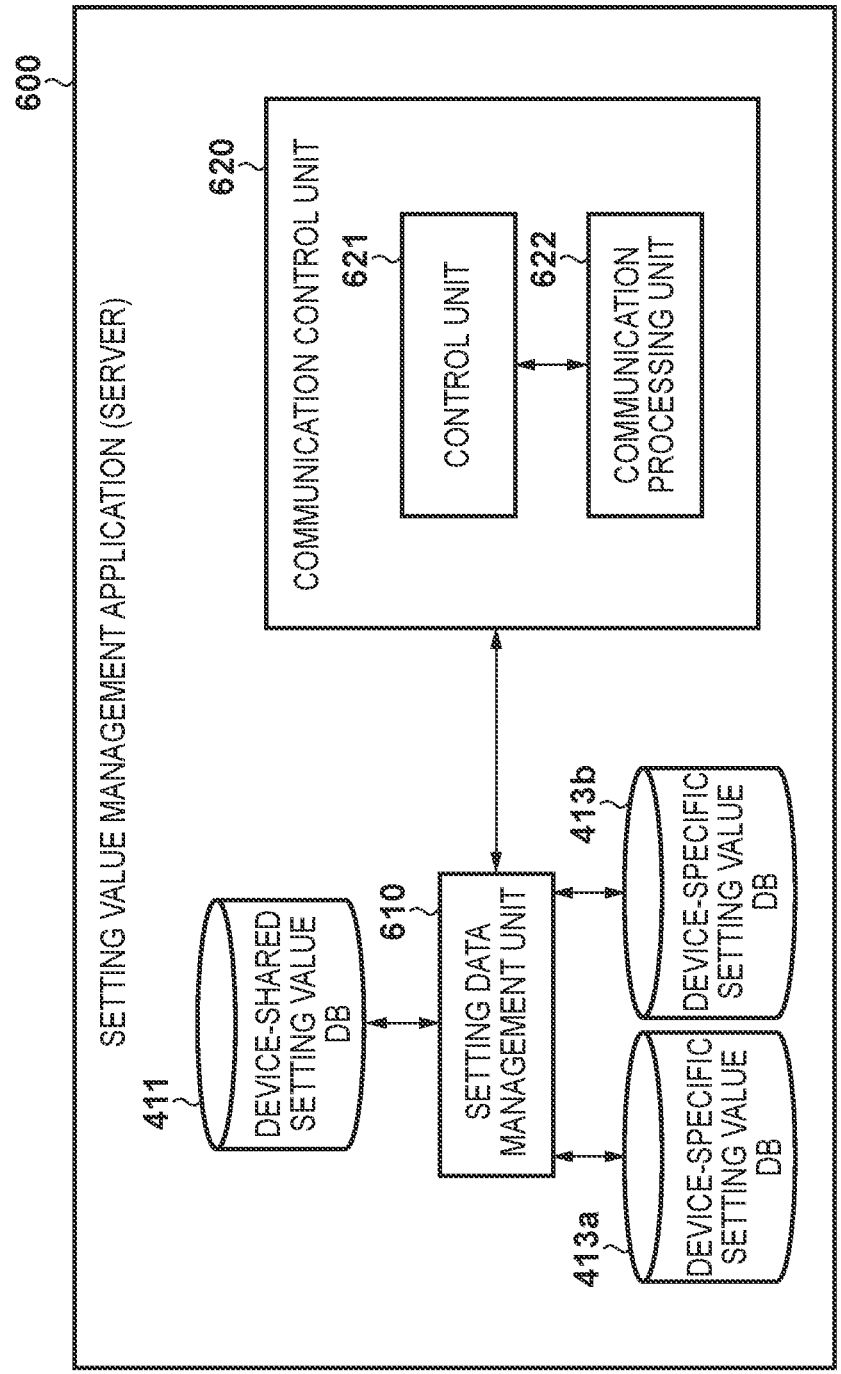
FIG. 6 is a software configuration of the setting value management server 110 in the setting value synchronization system according to an embodiment.

Description will be given regarding an example of a software configuration of a setting value management application which operates in the setting value management server 110 which is a server in the synchronization system according to embodiments with reference to FIG. 6. A setting value management application 600 is recorded to a storage unit of one of the RAM 204, the HDD 205, and the ROM 206 and is executed by the CPU 203 in the present specification. The setting value management application 600 is configured from a setting data management unit 610 and a communication control unit 620.

The setting data management unit 610 manages the device-specific setting value DBs 413 and the device-shared setting value DB 411 previously described among the setting data on the setting value management server 110. There is a device-specific setting value DB 413 for each of the multi-function peripherals 121 whose setting values are synchronized with the setting value management server 110. In the system configuration exemplified in FIG. 1, since the multi-function peripheral 121 and the multi-function peripheral 122 are management targets of the setting value management server 110, the device-specific setting value DBs 413a and 413b are managed in the setting data management unit 610 in that order.

The communication control unit 620 is configured from a plurality of blocks and performs control of communication via the network I/F 207. The device-shared setting value DB 411 and the device-specific setting value DB 413 that the setting data management unit 610 manages are saved in the HDD 205, the RAM 204, the ROM 206, or the like. The communication control unit 620 is configured from a control unit 621 which controls setting value synchronization processing with the multi-function peripheral 121 and a communication processing unit 622 which performs communication processing via the network I/F 207. Description will be given later regarding details of processing performed by each processor.

In a case where the communication control unit 620 receives the setting value update information from the multi-function peripheral 121, the setting data management unit 610 performs processing that causes it to be reflected to the device-shared setting value DB 411 and the device-specific setting value DBs 413 managed by the setting value management server 110. Also, the setting data management unit 610 generates information of differences in setting values which should be transmitted to the multi-function peripheral 121 and performs processing for making a notification to the communication control unit in a case where the communication control unit 620 receives a request to obtain the information of differences in setting values from the multi-function peripheral 121.

The communication control unit 620 controls a communication for synchronizing setting values with the multi-function peripheral 121. The control unit 621 performs processing for notifying the setting value update information to the setting data management unit 610 in a case where the communication processing unit 622 receives the setting value update information from the multi-function peripheral 121. Also, the control unit 621 performs processing for obtaining information of differences in setting values of the multi-function peripheral 121 from the setting data management unit 610 and making an instruction to the communication processing unit 622 such that this is transmitted to the multi-function peripheral 121 in a case where the communication processing unit 622 receives an obtainment request for information of differences in setting values from the multi-function peripheral 121. The communication processing unit 622 executes the communication processing with the multi-function peripheral 121 described above.

<Processing Procedure>

Figure 7:
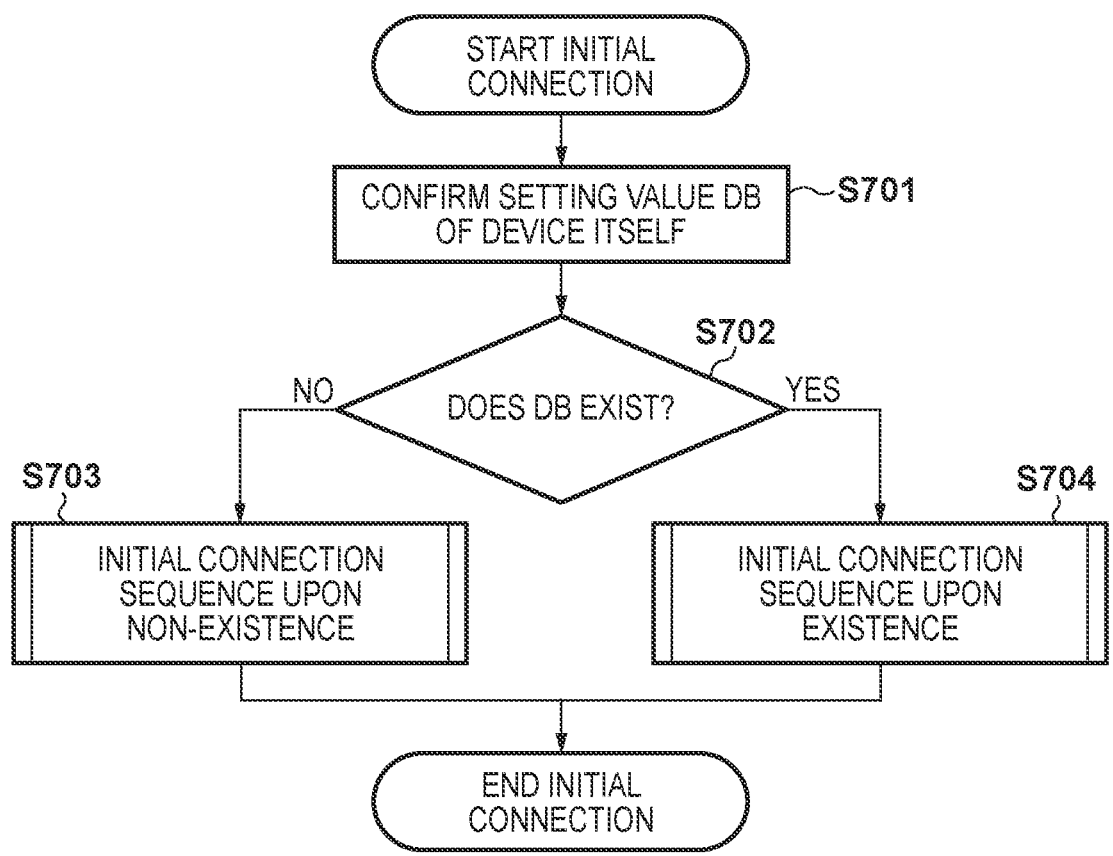
FIG. 7 is a flowchart of a processing procedure of the multi-function peripheral 121 according to an embodiment.

Next, description will be given regarding a processing procedure of an initial connection sequence at a time of a start of a synchronization with the setting value management server 110 in the setting value synchronization processing of the multi-function peripheral 121 according to embodiments with reference to FIG. 7. The processing described hereinafter is realized by a control program stored in the HDD 305 or the ROM 306 being read to the RAM 303 and then being executed, by the CPU 302 of the multi-function peripheral 121. Note, a method for making an instruction to start processing of the initial connection illustrated in the present flowchart may be performed by a user through the operation unit 320 for example, and other methods may also be used.

Firstly, in step S701, the synchronization control unit 520 generates request data for inquiring to the setting value management server 110 whether or not the device-specific setting value DB 413 corresponding to the multi-function peripheral 121 already exists, and confirms the existence of the foregoing information by requesting an execution of communication to the communication control unit 530. Note, in this request data, information for identifying the multi-function peripheral 121 is included and the setting value management server 110 performs confirmation of the existence of the device-specific setting value DB 413 corresponding to a multi-function peripheral from which the request was received by a later described processing procedure based on this information. The communication control unit 530 which received a communication request for an inquiry request executes the foregoing inquiry request towards the setting value management server 110. After this, the communication control unit 530 receives the result of the inquiry from the communication processing unit 622 of the setting value management server 110, transmits this to the synchronization control unit 520, and advances the processing to step S702.

In step S702, the synchronization control unit 520 analyzes the result of the inquiry received from the communication processing unit 622. As a result of the analysis, in a case where the device-specific setting value DB 413 corresponding to the multi-function peripheral 121 does not exist (a case where step S702 is NO), the processing advances to step S703, and in a case where it does exist (a case where step S702 is YES), the processing advances to step S704. In step S703, initial connection processing for a case where the device-specific setting value DB 413 corresponding to the multi-function peripheral 121 does not exist is performed and the processing terminates. Meanwhile, in step S704, initial connection processing for a case where the device-specific setting value DB 413 corresponding to the multi-function peripheral 121 does exist is performed and the processing terminates. Description will be given later regarding detailed processing of step S703 and step S704 using separate figures.

Figure 8:
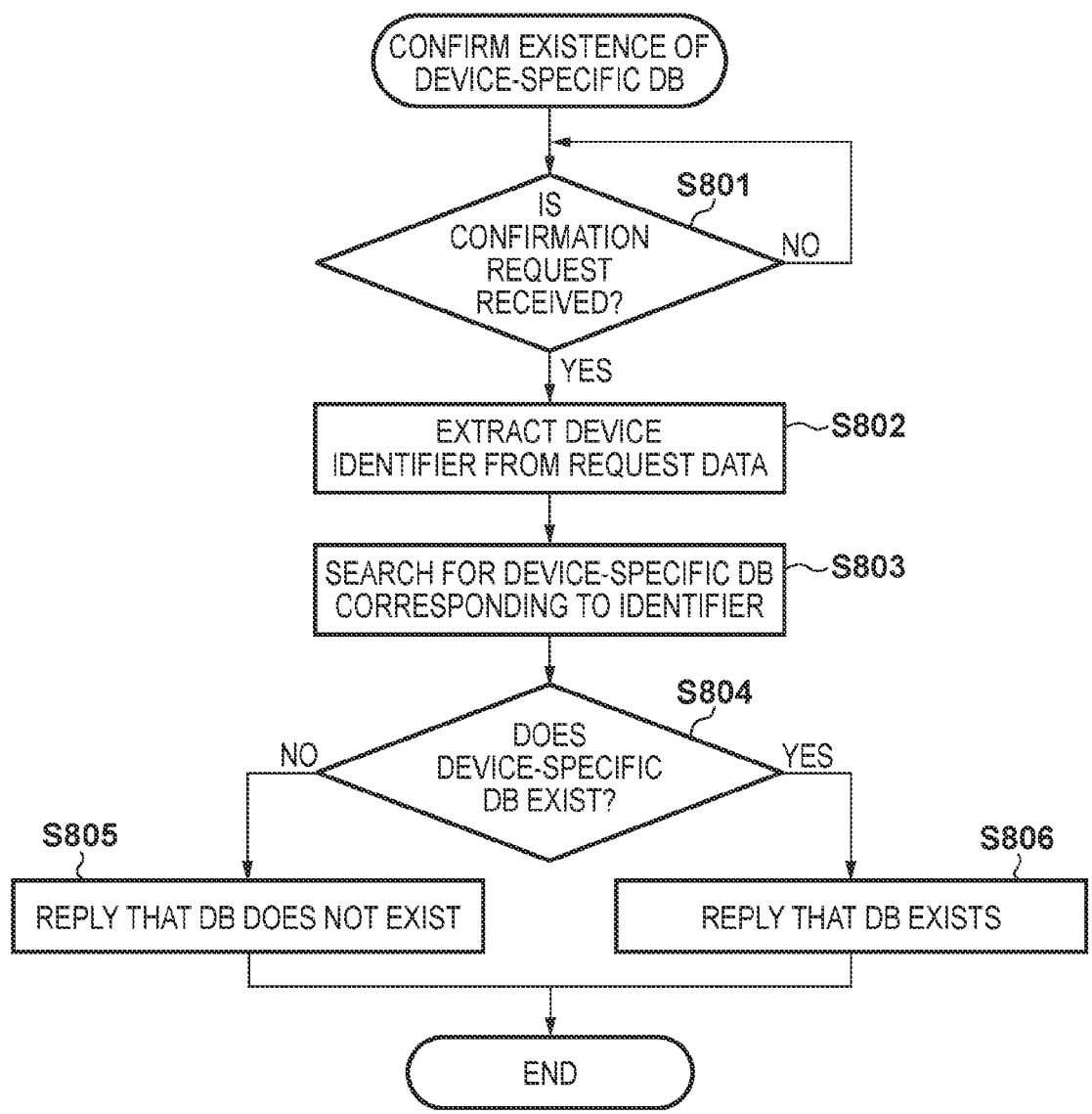
FIG. 8 is a flowchart of a processing procedure of the setting value management server 110 according to an embodiment.

Next, description will be given regarding a processing procedure of existence confirmation processing of the device-specific setting value DB 413 according to the setting value management server 110 which received the inquiry request with reference to FIG. 8. The processing described hereinafter is realized by a control program stored in the HDD 205 or the ROM 206 being read to the RAM 204 and then being executed, by the CPU 203 of the setting value management server 110.

Firstly, in step S801, the communication processing unit 622 monitors for an existence confirmation inquiry request from the multi-function peripheral 121 to determine whether or not one is received. As a result of the determination, the monitoring of step S801 continues in a case where the reception is not detected (a case where step S801 is NO). Meanwhile, in a case where the reception is detected (a case where step S801 is YES), something to that effect is notified to the control unit 621 and the processing advances to step S802.

In step S802, the control unit 621 extracts an individual identifier (device identifier) of the requestor multi-function peripheral 121 from data of the existence confirmation inquiry request included in the received notification. Subsequently, in step S803, the control unit 621 makes a request to the setting data management unit 610 for a determination of whether or not the device-specific setting value DB 413 corresponding to the extracted individual identifier exists. The setting data management unit 610 which received this searches for the device-specific setting value DB 413 corresponding to the requestor multi-function peripheral by comparing the individual identifier linked to the respective device-specific setting value DB 413 managed at that point in time and the individual identifier received from the control unit 621.

In step S804, the setting data management unit 610 makes a notification of the results of the search of step S803 to the control unit 621. Furthermore, the control unit 621 which received the notification determines whether or not a device-specific DB corresponding to the individual identifier exists. In a case where a notification that it does not exist is received (a case where step S804 is NO), the processing advances to step S805, and in a case where a notification that the device-specific DB corresponding to the individual identifier exists is received (a case where step S804 is YES), the processing advances to step S806.

In step S805, the control unit 621 generates reply data indicating that it does not exist and makes an instruction for execution of a reply to the communication processing unit 622 as a reply to the multi-function peripheral 121 of the requestor of the existence confirmation inquiry. The communication processing unit 622 that received this executes processing to transmit the reply data to the multi-function peripheral 121 and terminates the processing. Meanwhile, in step S806, the control unit 621 generates reply data indicating that the DB exists, the communication processing unit 622 transmits this to the multi-function peripheral 121, and the control unit 621 terminates the processing.

Figure 9:
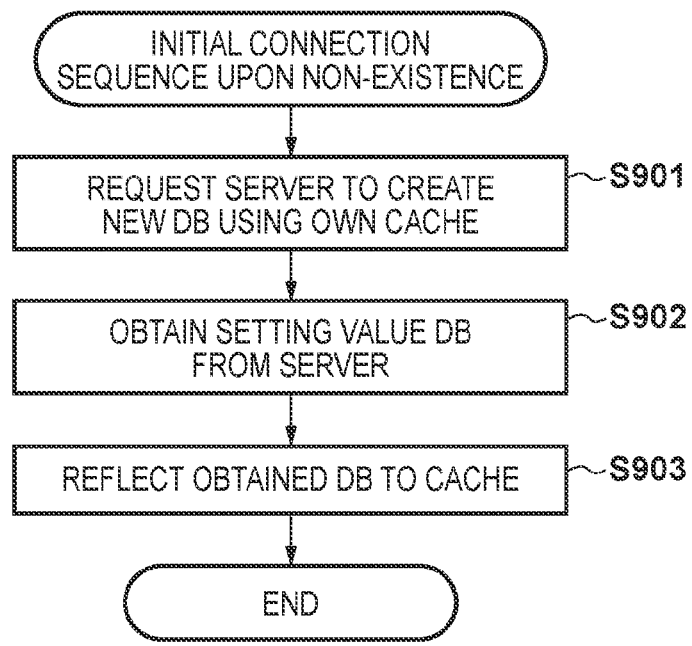
FIG. 9 is a flowchart of a processing procedure of the multi-function peripheral 121 according to an embodiment.

Next, description will be given regarding a processing procedure of an initial connection sequence in a case where the device-specific setting value DB 413 corresponding to the multi-function peripheral 121 does not exist in the foregoing step S703 with reference to FIG. 9. The processing described hereinafter is realized by a control program stored in the HDD 305 or the ROM 306 being read to the RAM 303 and then being executed, by the CPU 302 of the multi-function peripheral 121.

In step S901, the synchronization control unit 520 makes a request for an obtainment of the setting value DB 511 of the multi-function peripheral 121 from the setting data management unit 510. The setting data management unit 510 which received this generates a copy of the setting value DB 511 and transmits it to the synchronization control unit 520. Here, the transmitted copy of the setting value DB 511 is the same information as the information indicated in Table 7. Subsequently, the synchronization control unit 520 generates data for requesting generation of the device-specific setting value DB 413 corresponding to the setting value management server 110 based on the obtained copy of the setting value DB 511 and makes a request for an execution of a communication of the generation request to the communication control unit 530. The communication control unit 530 which received the request executes communication of the generation request to the setting value management server 110 and advances the processing to step S902.

In step S902, the synchronization control unit 520 generates data for requesting obtainment of the device-specific setting value DB 413 generated after step S901 and makes a request for an execution of a communication of the obtainment request to the communication control unit 530. The communication control unit 530 which received this executes communication of the obtainment request to the setting value management server 110.

Next, in step S903, the synchronization control unit 520 transmits the received reply data to the setting data management unit 510 and makes a request for an update of the setting value DB 511 according to the reply data. The setting data management unit 510 which received the request updates a value of each setting value corresponding to the setting value DB by each setting value included in the reply data and terminates the processing. As a result of performing this kind of procedure, the setting value DB 511 is in the same state as Table 8 described later. The above was an explanation of the initial connection sequence according to step S703 in the case where the device-specific setting value DB 413 corresponding to the multi-function peripheral 121 does not exist on the setting value management server 110.

Next, description will be given regarding a processing procedure of the setting value management server 110 which received a generation request according to the foregoing step S901 with reference to FIG. 11. The processing described hereinafter is realized by a control program stored in the HDD 205 or the ROM 206 being read to the RAM 204 and then being executed, by the CPU 203 of the setting value management server 110.

Firstly, in step S1101, the communication processing unit 622 of the setting value management server 110 determines (monitors) the existence or absence of a reception of a generation request from the multi-function peripheral 121. As a result of this determination, monitoring continues according to step S1101 in a case where there is no reception, but the control unit 621 is notified in a case where there was a reception, and the processing advances to step S1102.

In step S1102, the control unit 621 makes a request for a generation execution to the setting data management unit 610 based on the generation request received from the communication processing unit 622. Furthermore, the setting data management unit 610 which received the request obtains one item's worth of information from a plurality of setting value information items included in the generation request and advances the processing to step S1103.

In step S1103, the setting data management unit 610 obtains management classification information of the one obtained setting value information item and determines which of "edit/reference" and "reference only" it is. As a result of this determination, in a case where it is "edit/reference" (a case where step S1103 is NO) the processing advances to step S1104, and in a case where it is "reference only" (a case where step S1103 is YES) the processing advances to step S1106.

In step S1104, the setting data management unit 610 obtains from the device-shared setting value DB 411 the value of the setting value for which the information was extracted in step S1102 and advances the processing to step S1105. Subsequently, in step S1105, the setting data management unit 610 generates the setting value for which the information was extracted in step S1102 in the device-specific setting value DB 413 corresponding to the requestor multi-function peripheral 121 by using the value obtained in step S1104 and advances the processing step S1107. Meanwhile, in step S1106, the setting data management unit 610 makes a request to the device-specific setting value DB 413 corresponding to the requestor multi-function peripheral 121 to generate the setting value for which the information was extracted in step S1102 as is and advances the processing step S1107.

In step S1107, the setting data management unit 610 determines the existence or absence of a setting value, among setting values included in the generation request, that has not been generated in the device-specific setting value DB 413 corresponding to the requestor multi-function peripheral 121. As a result of this determination, in a case where the setting value is not generated, processing of step S1102 through step S1107 is executed regarding the not generated setting value. Meanwhile, in a case where there was no setting value that has not been generated, the processing terminates.

As a result of performing the generation processing in the flow as above, the device-specific setting value DB 413 corresponding to the multi-function peripheral 121 is generated in the state indicated in Table 8. A description such as "0⇒1" or "100⇒3600" of the column "value" in Table 8 clarifies that values included in the generation request that each multi-function peripheral 121 transmitted are overwritten from 0 to 1 and 100 to 3600 respectively by step S1104 and step S1105. Accordingly, only values after the overwriting are actually stored. Hereinafter, unless specified, "⇒" is used for similar expressions in tables.

TABLE 8

| key identifier | value | management classification |
| --- | --- | --- |
| settings.pattern | 0⇒1 | edit/reference |
| settings.density | 0 | edit/reference |
| settings.sleep_time | 100⇒3600 | edit/reference |
| settings.dns_address | "xxx.xxx.xxx.xxx" | edit/reference |
| settings.device_serial | "WXYZ12ABC" | reference only |
| settings.copy_cur_page | 66 | reference only |
| settings.notice.device_state | 0 | reference only |
| . . . | | |

Figure 12:
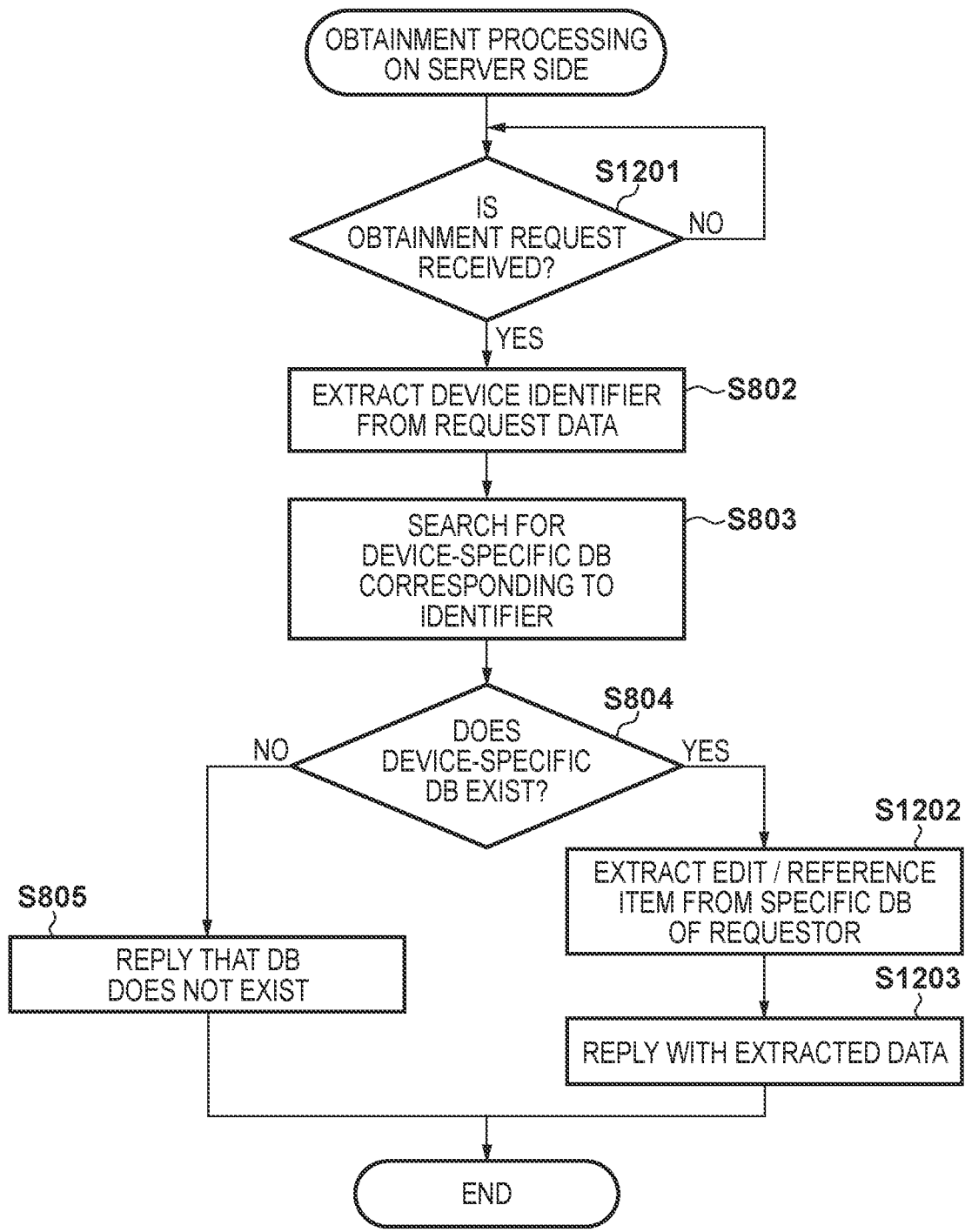
FIG. 12 is a flowchart of a processing procedure of the setting value management server 110 according to an embodiment.

Next, description will be given regarding a processing procedure of the setting value management server 110 which received an obtainment request according to the foregoing step S902 with reference to FIG. 12. The processing described hereinafter is realized by a control program stored in the HDD 205 or the ROM 206 being read to the RAM 204 and then being executed, by the CPU 203 of the setting value management server 110. Note, since step S802 to step S805 are the same processing as described using FIG. 8, here descriptions thereof are given the same reference numerals and will be omitted among the processing procedure described in the flow.

Firstly, in step S1201, the communication processing unit 622 determines (monitors) whether or not an obtainment request is received from the multi-function peripheral 121. As a result of the determination, the monitoring of step S1201 continues in a case where the reception is not detected (a case where step S1201 is NO). Meanwhile, in a case where the reception is detected (a case where step S1201 is YES), something to that effect is notified to the control unit 621 and the processing advances to step S802. After this, passing the previously described step S802 and step S803, the processing advances to step S1202 in a case where step S804 is YES. In step S1202, the setting data management unit 610 extracts information of a setting value for which the management classification is "edit/reference" from the device-specific setting value DB 413 corresponding to the requestor multi-function peripheral 121, makes a notification of it to the control unit 621, and advances the processing to step S1203. Here, data extracted as a result of executing the processing of step S1202 is indicated in Table 9.

TABLE 9

| key identifier | value | management classification |
|---|---|---|
| settings.pattern | 1 | edit/reference |
| settings.density | 0 | edit/reference |
| settings.sleep_time | 3600 | edit/reference |
| settings.dns_address | "xxx.xxx.xxx.xxx" | edit/reference |
| ... | | |

In step S1203, the control unit 621 generates reply data corresponding to the requestor multi-function peripheral 121 from the "edit/reference" setting value information received from the setting data management unit 610 and makes an instruction for an execution of the transmission to the communication processing unit 622. The communication processing unit 622 that received this executes transmission of the reply data and terminates the processing. In step S1203, the communication control unit 530 which received the transmitted reply data transmits it to the synchronization control unit 520 and advances the processing to step S903 of FIG. 9. As described above, configuration may be taken so that in step S1203, only the "edit/reference" setting value information is transmitted to the multi-function peripheral 121 and "reference only" setting value information is not transmitted to the multi-function peripheral 121 to maintain the setting value information that the multi-function peripheral 121 holds. By this, processing load and network communication traffic can be reduced. Meanwhile, a "reference only" setting value information can also be transmitted to the multi-function peripheral 121 according to the specification and the like. In such a case, the multi-function peripheral 121 can also perform control so as to select an optimal value by comparing "reference only" setting value information that the self-apparatus holds and received setting value information.

Figure 10:
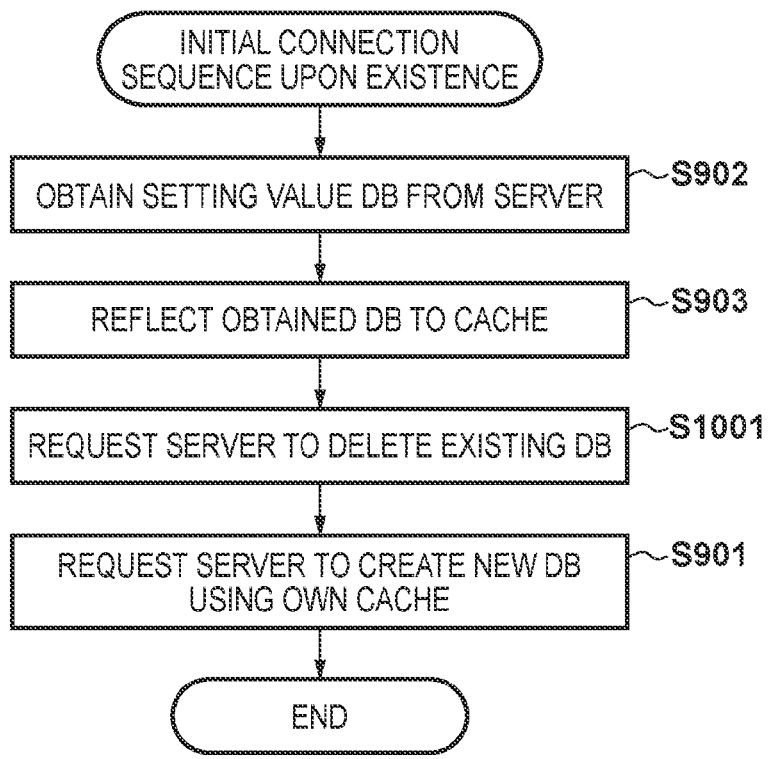
FIG. 10 is a flowchart of a processing procedure of the multi-function peripheral 121 according to an embodiment.

Next, description will be given regarding a processing procedure of an initial connection sequence in a case where the device-specific setting value DB 413 corresponding to the multi-function peripheral 121 does not exist on the setting value management server 110 in the foregoing step S704 with reference to FIG. 10. The processing described hereinafter is realized by a control program stored in the HDD 305 or the ROM 306 being read to the RAM 303 and then being executed, by the CPU 302 of the multi-function peripheral 121. Note, since step S901, step S902, and step S903 in FIG. 10 are the same as the processing described using FIG. 9, a detailed description of these steps will be omitted. Also, for the description, it is assumed that the setting value DB 511 of the multi-function peripheral 121, when step S704 is executed, is in the state indicated in the later described Table 10, the device-shared setting value DB 411 is in the state indicated in Table 2, and the device-specific setting value DB 413 corresponding to the setting value management server 110 is in the state indicated in Table 3 respectively.

TABLE 10

| key identifier | value | management classification |
|---|---|---|
| settings.pattern | 0 | edit/reference |
| settings.density | 0 | edit/reference |
| settings.sleep_time | 100 | edit/reference |
| settings.dns_address | "xxx.xxx.xxx.xxx" | edit/reference |
| settings.device_serial | "WXYZ12ABC" | reference only |
| settings.copy_cur_page | 66 | reference only |
| settings.notice.device_state | 1 | reference only |
| ... | | |

Firstly, the state is such that the setting values for which the management classification is "edit/reference" in the device-specific setting value DB 413 corresponding to the multi-function peripheral 121 are reflected to the setting value DB 511 by the processing of step S902 and step S903. Specifically, the state is as indicated in Table 11.

TABLE 11

| key identifier | value | management classification |
|---|---|---|
| settings.pattern | 0 ⇒ 1 | edit/reference |
| settings.density | 0 | edit/reference |
| settings.sleep_time | 100 ⇒ 3600 | edit/reference |
| settings.dns_address | "xxx.xxx.xxx.xxx" | edit/reference |
| settings.device_serial | "WXYZ12ABC" | reference only |
| settings.copy_cur_page | 66 | reference only |
| settings.notice.device_state | 1 | reference only |
| ... | | |

Next, in step S1001, the synchronization control unit 520 generates data for requesting deletion of the device-specific setting value DB 413 corresponding to the multi-function peripheral 121 and makes a request to the communication control unit 530 for an execution of the communication. The communication control unit 530 which received this transmits a deletion request to the setting value management server 110. A processing procedure of the setting value management server 110 according to the deletion request in step S1001 will be described later using FIG. 13. When processing of the setting value management server 110 according to the deletion request is executed, the device-specific setting value DB 413 corresponding to the multi-function peripheral 121 is temporarily deleted from the setting value management server 110 and the processing advances to step S901. Also, in step S901, the setting value DB 511 of the multi-function peripheral 121 in the setting value management server 110 is generated in the same state as the setting value DB 511 of the multi-function peripheral 121 at that point in time indicated in Table 11 and the initial connection processing described using FIG. 7 is completed.

Figure 13:
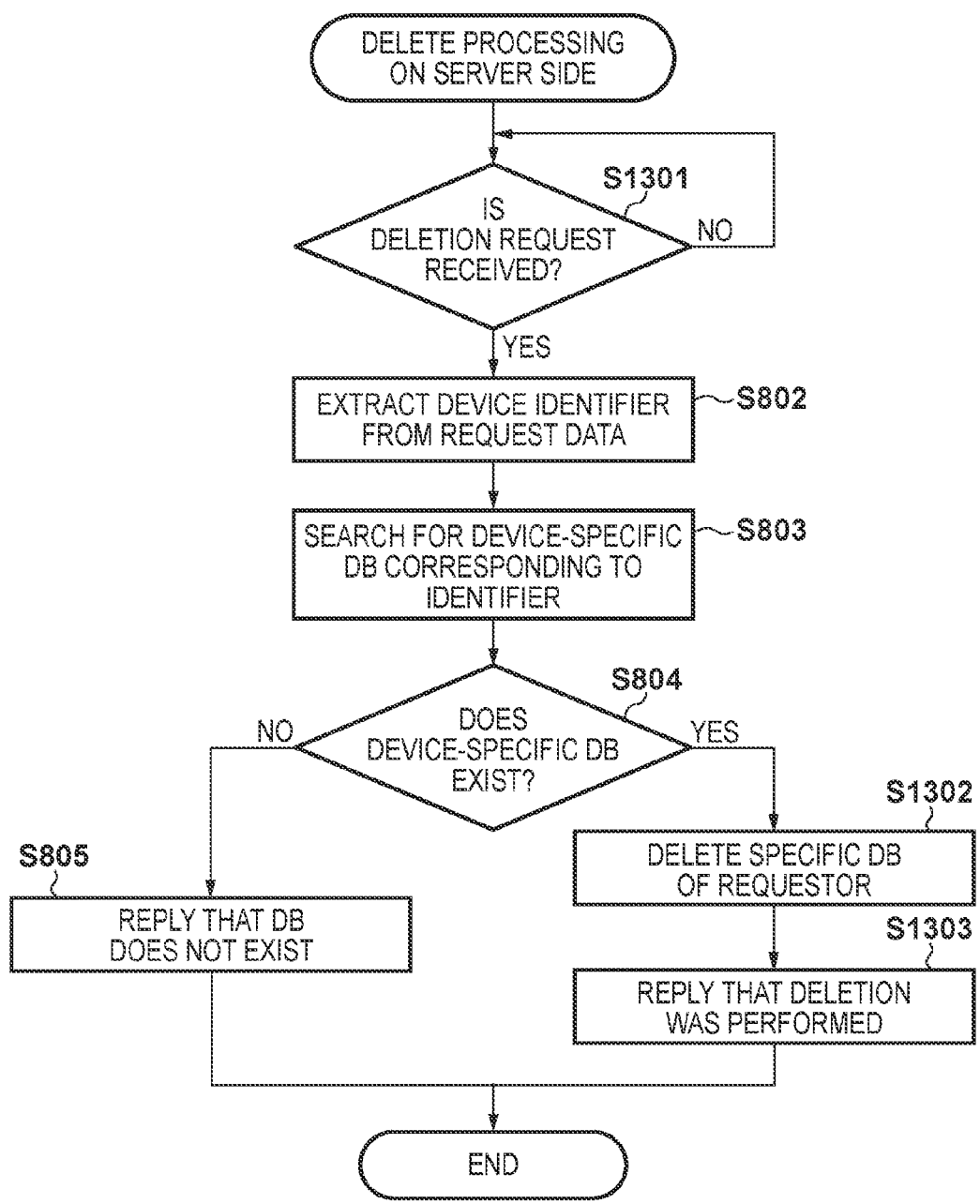
FIG. 13 is a flowchart of a processing procedure of the setting value management server 110 according to an embodiment.

Next, description will be given regarding a processing procedure of the setting value management server 110 which received a deletion request according to the foregoing step S1001 with reference to FIG. 13. The processing described hereinafter is realized by a control program stored in the HDD 205 or the ROM 206 being read to the RAM 204 and then being executed, by the CPU 203 of the setting value management server 110. Note, since step S802 to step S805 are the same processing as described using FIG. 8, here descriptions thereof will be omitted among the processing procedure described in the flow.

Firstly, in step S1301, the communication processing unit 622 determines (monitors) whether or not a deletion request is received from the multi-function peripheral 121. As a result of the determination, the monitoring of step S1301 continues in a case where the reception is not detected (a case where step S1301 is NO). Meanwhile, in a case where the reception is detected (a case where step S1301 is YES), something to that effect is notified to the control unit 621 and the processing advances to step S802.

After this, passing the previously described step S802 and step S803, the processing advances to step S1302 in a case where step S804 is YES. In step S1302, the setting data management unit 610 deletes the device-specific setting value DB 413 corresponding to the requestor multi-function peripheral 121, makes a notification of something to that effect to the control unit 621, and advances the processing to step S1303. In step S1303, the control unit 621 generates reply data indicating that deletion succeeded and makes an instruction for transmitting this to the requestor multi-function peripheral 121. The communication processing unit 622 that received this instruction executes transmission of the reply data to the requestor multi-function peripheral 121 and terminates the processing.

As described above, the image processing apparatus according to the embodiment makes an inquiry for information of whether or not a first database relating to a setting item of the self-apparatus exists, to the external apparatus when initially connecting to a network. When it is confirmed that a first database exists, setting values of the first database are obtained and the obtained setting values are reflected to a second database held in the self-apparatus. Furthermore, a request is made to the external apparatus to update information of the first database by the reflected setting values of the second database. By this, it becomes possible to include setting value items that are "reference only" and synchronize them without inconsistencies by performing initial connection processing between the multi-function peripheral 121 and the setting value management server 110. In this way, it is possible to suitably synchronize every setting value between a server and a client separately from whether or not each setting value is editable. By virtue of the present embodiment, it is effective in a case where synchronization with a device that once connected to a server terminates and then later connects once again, and in a case where, in order to allow operation, when a device is replaced, with setting values of a device that has been connected to the server in the past the setting values of that device are caused to be synchronized. In other words, it is possible to synchronize a reference only setting item between a server and a client even in a case where a database of the multi-function peripheral already exists in the server at a time of an initial connection (including a time of reconnection).

Second Embodiment

Below, explanation will be given for a second embodiment of the present invention. In the present embodiment, description will be given, using figures, of enabling a reduction of processing load or network communication amount in initial connection processing between the multi-function peripheral 121 and the setting value management server 110 in addition to the effect of the invention described in the foregoing first embodiment by appropriately working the present invention. Note, since a portion of the system configuration, the hardware configuration, the software configuration, the data structures, and the processing procedures of the present embodiment is the same as what is discussed in the foregoing first embodiment, the same reference numerals are used and description is omitted; description is given only for differing points. Also, for the description, it is assumed that the setting value DB 511 of the multi-function peripheral 121, when step S704 is executed, is in the state indicated in Table 10, and the device-shared setting value DB 411 is in the state indicated in Table 2, and the device-specific setting value DB 413 corresponding to the setting value management server 110 is in the state indicated in Table 2.

Figure 14:
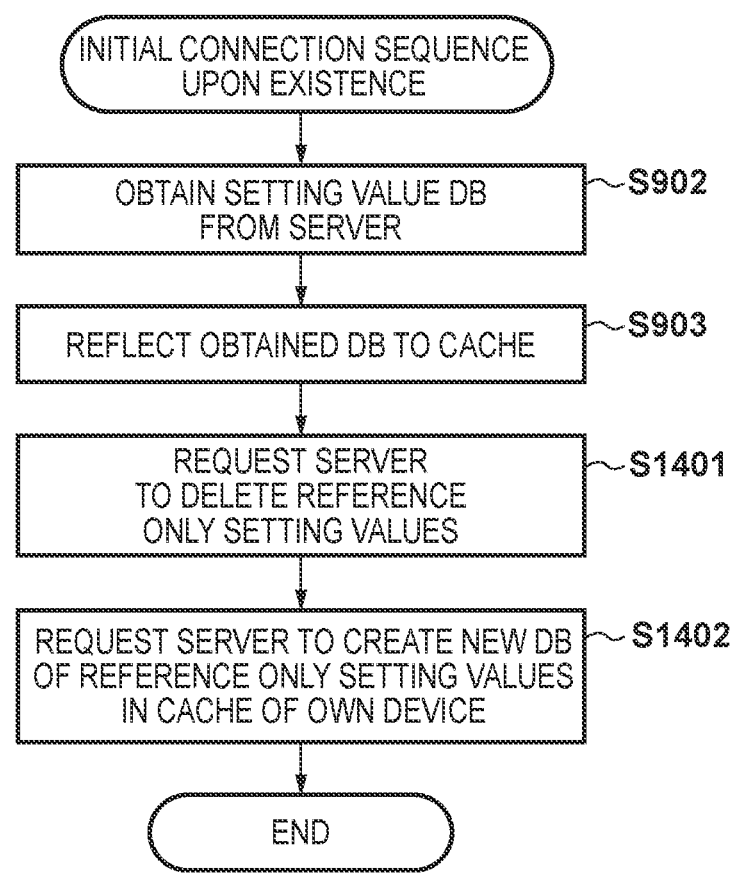
FIG. 14 is a flowchart of a processing procedure of the multi-function peripheral 121 according to an embodiment.

Next, description will be given regarding a processing procedure of an initial connection sequence in a case where the device-specific setting value DB 413 corresponding to the multi-function peripheral 121 exists on the setting value management server 110 in step S704 with reference to FIG. 14. The processing described hereinafter is realized by a control program stored in the HDD 305 or the ROM 306 being read to the RAM 303 and then being executed, by the CPU 302 of the multi-function peripheral 121.

Firstly, the state is such that the setting values for which the management classification is "edit/reference" in the device-specific setting value DB 413 corresponding to the multi-function peripheral 121 are reflected to the setting value DB 511 by the processing of step S902 and step S903. Subsequently, in step S1401, the synchronization control unit 520 generates data for requesting deletion corresponding to setting values for which the management classification is "reference only" in the device-specific setting value DB 413 corresponding to the multi-function peripheral 121, and makes a request to the communication control unit 530 for an execution of the communication. The communication control unit 530 which received this transmits a "reference only" setting value deletion request to the setting value management server 110.

Next, in step S1402, the synchronization control unit 520 makes a request to the setting data management unit 510 for an extraction of items for which the management classification is "reference only" among the setting values included in the setting value DB 511. The setting data management unit 510 which received this extracts the items whose management classification is "reference only" from the setting value DB 511 and transmits them to the synchronization control unit 520. The synchronization control unit 520 which received this uses the extracted "reference only" setting values to generate data to make a request for an update to the setting value management server 110, and makes a request to the communication control unit 530 for an execution of a transmission of a generation request. The communication control unit 530 which received this executes the transmission of the generation request for setting values for which the management classification is "reference only" to the setting value management server 110.

Figure 11:
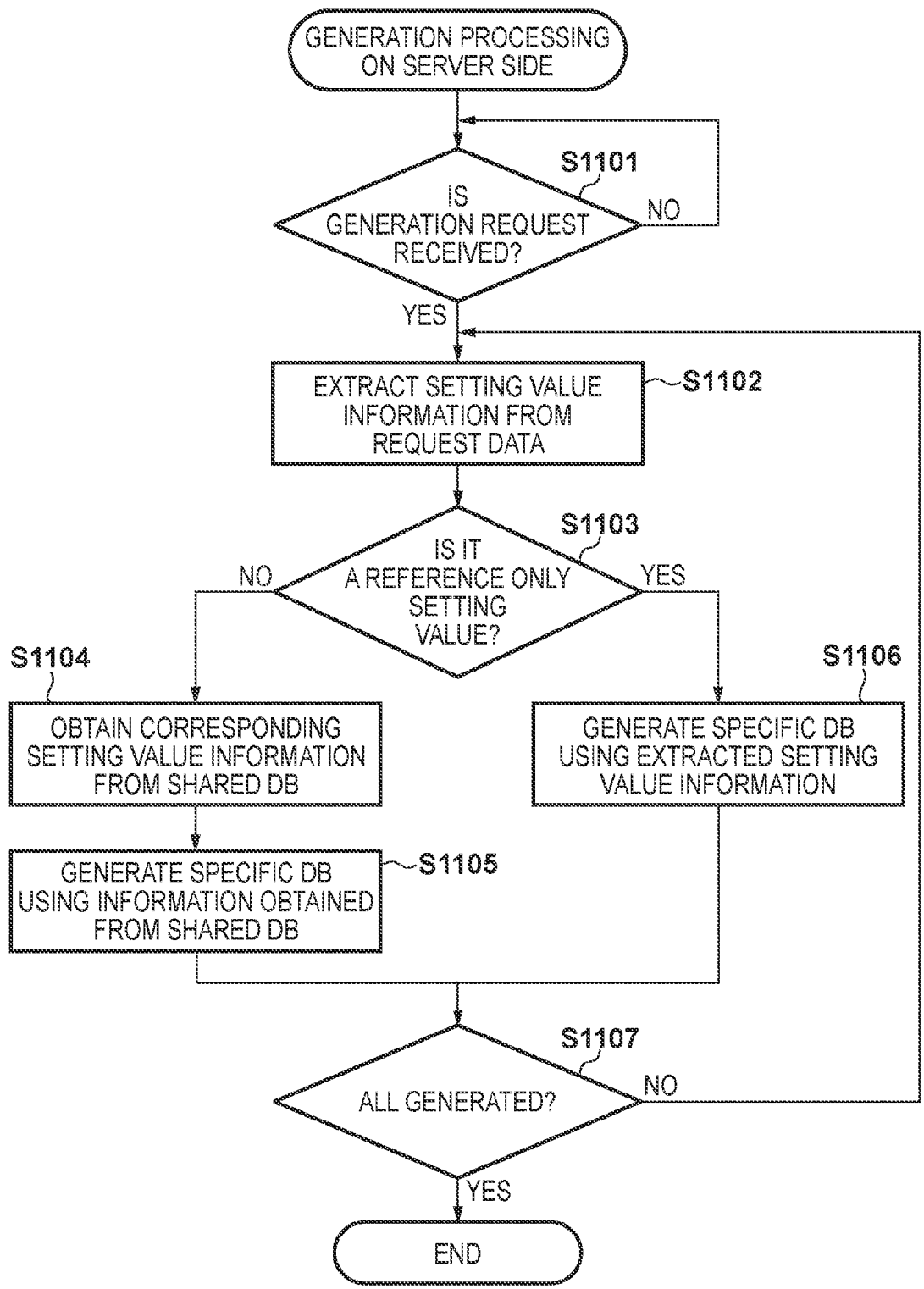
FIG. 11 is a flowchart of a processing procedure of the setting value management server 110 according to an embodiment.

Generation processing by the setting value management server which received the generation request is the same as the processing procedure indicated in FIG. 11. However, in the present embodiment, the data for requesting generation transmitted from the multi-function peripheral 121 is something that relates to all setting values for which the management classification is "reference only". For this reason, the determination result of step S1103 is YES for every setting value in the flow of FIG. 11.

Figure 15:
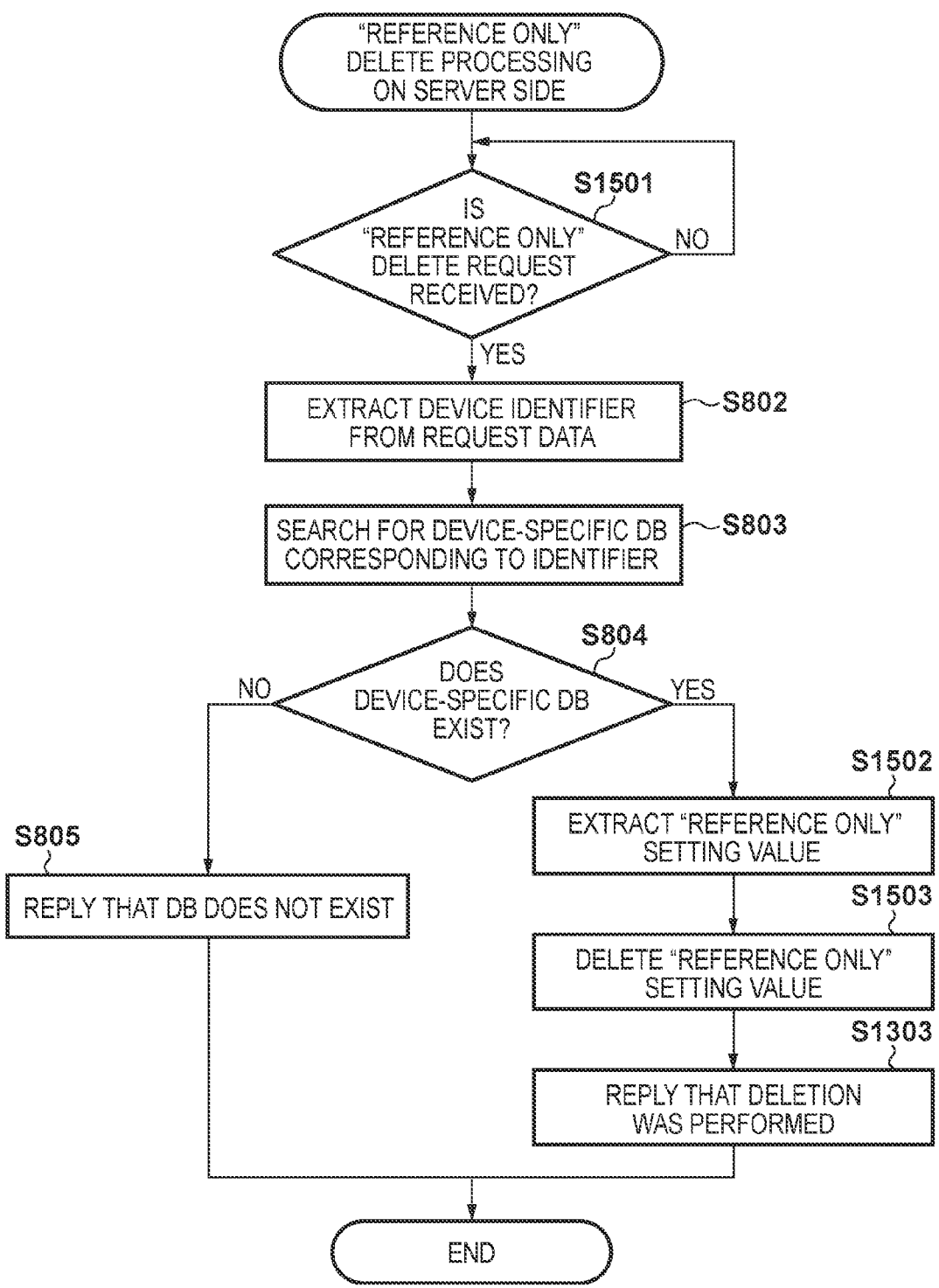
FIG. 15 is a flowchart of a processing procedure of the setting value management server 110 according to an embodiment.

Next, description will be given regarding a processing procedure of the setting value management server 110 which received a "reference only" setting value deletion request according to step S1401 with reference to FIG. 15. The processing described hereinafter is realized by a control program stored in the HDD 205 or the ROM 206 being read to the RAM 204 and then being executed, by the CPU 203 of the setting value management server 110. Note, since step S802 to step S805 are the same processing as described using FIG. 8, here descriptions thereof will be omitted among the processing procedure described in the flow.

Firstly, in step S1501, the communication processing unit 622 determines (monitors) whether or not a "reference only" deletion request is received from the multi-function peripheral 121. As a result of the determination, the monitoring of step S1501 continues in a case where the reception is not detected (a case where step S1501 is NO). Meanwhile, in a case where the reception is detected (a case where step S1501 is YES), something to that effect is notified to the control unit 621 and the processing advances to step S802. After this, passing the previously described step S802 and step S803, the processing advances to step S1502 in a case where step S804 is YES. In step S1502, the setting data management unit 610 extracts items for which the management classification is "reference only" from the device-specific setting value DB 413 corresponding to the requestor multi-function peripheral 121, and advances the processing to step S1503. In step S1502, the extracted items are indicated in Table 12.

TABLE 12

| key identifier | value | management classification |
| --- | --- | --- |
| settings.device_serial | "WXYZ12ABC" | reference only |
| settings.copy_cur_page | 66 | reference only |
| settings.notice.device_state | 1 | reference only |
| ... | | |

In step S1503, the setting data management unit 610 deletes items extracted in step S1502 from the device-specific setting value DB 413 corresponding to the requestor multi-function peripheral 121, makes a notification of something to that effect to the control unit 621, and advances the processing to step S1303. In step S1303, the control unit 621 generates reply data indicating that deletion succeeded and makes an instruction for transmitting this to the requestor multi-function peripheral 121. The communication processing unit 622 which received the instruction executes a transmission of reply data corresponding to the requestor multi-function peripheral 121 and terminates the processing. By the procedure above, deletion processing corresponding to a "reference only" item illustrated in step S1401 is performed and the processing advances to step S1402.

As described above, by virtue of the present embodiment, in addition to the effect of the invention described in the foregoing first embodiment, it is possible to perform generation processing by limiting data for making a request for generation to the setting value management server 110 to setting values for which the management classification is "reference only". By this, an effect of reducing processing load and communication traffic becomes attainable.

Third Embodiment

Below, explanation will be given for a third embodiment of the present invention. In the present embodiment, description will be given, using the figures, of achieving the same effect of the invention as in the foregoing first embodiment in an implementation of the present invention using a different procedure to the foregoing first embodiment. Note, since a portion of the system configuration, the hardware configuration, the software configuration, the data structures, and the processing procedures of the present embodiment is the same as what is discussed in the foregoing first and second embodiments, the same reference numerals are used and description is omitted; description is given only for differing points. Also, for the description, it is assumed that the setting value DB 511 of the multi-function peripheral 121 when step S704 is executed is in the state indicated in Table 10, the device-shared setting value DB 411 is in the state indicated in Table 2, and the device-specific setting value DB 413 corresponding to the setting value management server 110 is in the state indicated in Table 2.

Figure 16:
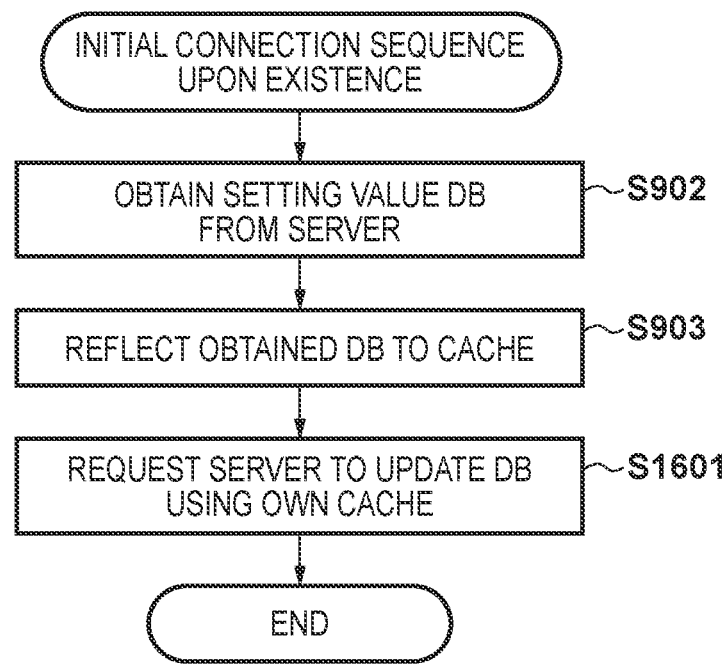
FIG. 16 is a flowchart of a processing procedure of the multi-function peripheral 121 according to an embodiment.

Next, description will be given regarding a processing procedure of an initial connection sequence in a case where the device-specific setting value DB 413 corresponding to the multi-function peripheral 121 exists on the setting value management server 110 in step S704 with reference to FIG. 16. The processing described hereinafter is realized by a control program stored in the HDD 305 or the ROM 306 being read to the RAM 303 and then being executed, by the CPU 302 of the multi-function peripheral 121.

Firstly, the state is such that the setting values for which the management classification is "edit/reference" in the device-specific setting value DB 413 corresponding to the multi-function peripheral 121 are reflected to the setting value DB 511 by the processing of step S902 and step S903. At that time, the setting value DB 511 is in the same state as what is indicated in Table 11.

Next, in step S1601, the synchronization control unit 520 makes a request for an obtainment of the setting value DB 511 of the multi-function peripheral 121 from the setting data management unit 510. The setting data management unit 510 which received this generates a copy of the setting value DB 511 and transmits it to the synchronization control unit 520. Subsequently, the synchronization control unit 520 generates data for requesting an update of the device-specific setting value DB 413 corresponding to the setting value management server 110 based on the obtained copy of the setting value DB 511 and makes a request for an execution of a communication of the update request to the communication control unit 530. The communication control unit 530 which received this request executes communication of the update request to the setting value management server 110. At that time, the generated update data is data representing the state indicated in Table 10.

Figure 17:
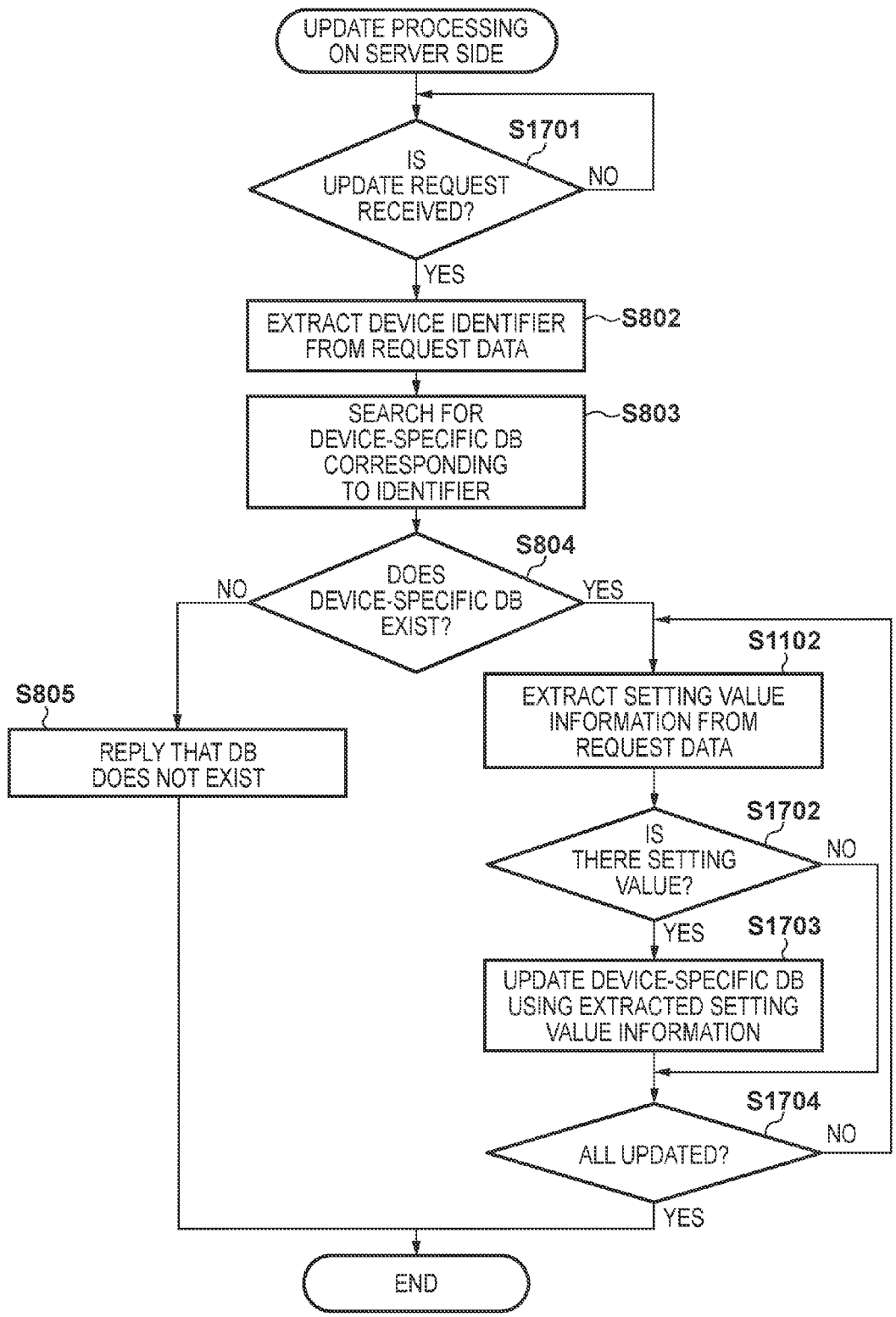
FIG. 17 is a flowchart of a processing procedure of the setting value management server 110 according to an embodiment.

Next, description will be given regarding a processing procedure of the setting value management server 110 which received an update request in step S1601 with reference to FIG. 17. The processing described hereinafter is realized by a control program stored in the HDD 205 or the ROM 206 being read to the RAM 204 and then being executed, by the CPU 203 of the setting value management server 110.

Firstly, in step S1701, the communication processing unit 622 determines (monitors) whether or not an update request is received from the multi-function peripheral 121. As a result of the determination, the monitoring of step S1701 continues in a case where the reception is not detected (a case where step S1701 is NO). Meanwhile, in a case where the reception is detected (a case where step S1701 is YES), something to that effect is notified to the control unit 621 and the processing advances to step S802. After this, passing the previously described step S802 and step S803, the processing advances to step S1102 in a case where step S804 is YES.

In step S1102, the control unit 621 makes a request for an update execution to the setting data management unit 610 based on the update request received from the communication processing unit 622. The setting data management unit 610 which received the request obtains one item's worth of information from a plurality of setting value information items included in the update request and advances the processing to step S1702. In step S1702, the setting data management unit 610 determines whether or not the setting value obtained in step S1102 exists in the device-specific setting value DB 413 corresponding to the requestor multi-function peripheral 121. As a result of this determination, in a case where one does not exist (a case where step S1702 is NO) the processing advances to step S1704, and in a case where one exists (a case where step S1702 is YES) the processing advances to step S1703.

In step S1703, the setting data management unit 610 updates the corresponding setting value in the device-specific setting value DB 413 corresponding to the requestor multi-function peripheral 121 with the setting value information obtained in step S1102, and advances the processing to step S1704. In step S1704, the setting data management unit 610 determines the existence or absence of a setting value for which extraction of the setting value information in step S1102 has not been performed among the setting values included in the update request. As a result of this determination, if a setting value for which an extraction has not been performed exists, the processing of step S1102 and step S1702 through step S1704 is executed for that setting value. Meanwhile, if no setting value for which extraction has not been performed exists, the processing is terminated. The state of the device-specific setting value DB 413 is as in Table 13 by the above processing procedure.

TABLE 13

| key identifier | value | management classification |
| --- | --- | --- |
| settings.device_serial | "WXYZ12ABC" | reference only |
| settings.copy_cur_page | 66 | reference only |
| settings.notice.device_state | 0⇒1 | reference only |
| . . . | | |

As described above, by virtue of the present embodiment, a similar effect of the invention is possible by a communication procedure that is different from that of the foregoing first embodiment.

Fourth Embodiment

Below, explanation will be given for a fourth embodiment of the present invention. In the present embodiment, description will be given, using the figures, of achieving the same effect of the invention as in the foregoing third embodiment in an implementation of the present invention using a different procedure to the foregoing third embodiment. Note, since a portion of the system configuration, the hardware configuration, the software configuration, the data structures, and the processing procedures of the present embodiment is the same as what is discussed in the foregoing first, second, and third embodiments, the same reference numerals are used and description is omitted; description is given only for differing points. Also, for the description, it is assumed that the setting value DB 511 of the multi-function peripheral 121, when step S704 is executed, is in the state indicated in Table 10, and the device-shared setting value DB 411 is in the state indicated in Table 2, and the device-specific setting value DB 413 corresponding to the setting value management server 110 is in the state indicated in Table 2.

Figure 18:
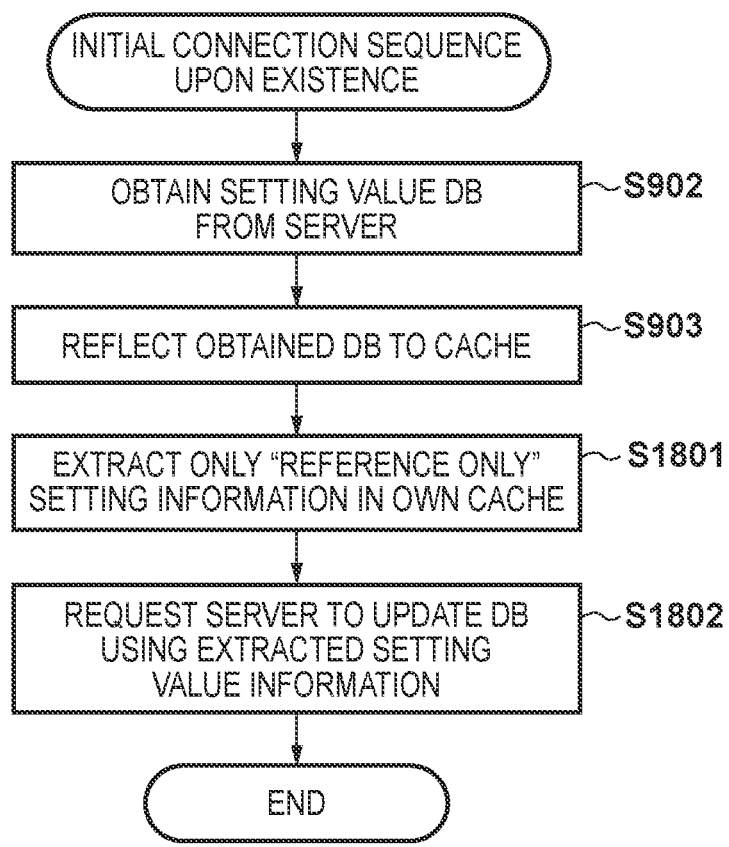
FIG. 18 is a flowchart of a processing procedure of the multi-function peripheral 121 according to an embodiment.

Next, description will be given regarding a processing procedure of an initial connection sequence in a case where the device-specific setting value DB 413 corresponding to the multi-function peripheral 121 exists on the setting value management server 110 in step S704 with reference to FIG. 18. Firstly, the state is such that the setting values for which the management classification is "edit/reference" in the device-specific setting value DB 413 corresponding to the multi-function peripheral 121 are reflected to the setting value DB 511 by the processing of step S902 and step S903.

Subsequently, in step S1801, the synchronization control unit 520 makes a request to the setting data management unit 510 for obtainment of setting values for which the management classification is "reference only" in the device-specific setting value DB 413 corresponding to the multi-function peripheral 121. The setting data management unit 510 which received this obtains setting value information corresponding to setting values for which the management classification is "reference only" from the setting value DB 511, transmits this to the synchronization control unit 520, and advances the processing to step S1802. The items extracted in step S1801 are indicated in Table 12. In step S1802, the synchronization control unit 520 which received the "reference only" setting value setting value information from the setting data management unit 510 generates update request data corresponding to the received setting value information and makes a request for an execution of the communication to the communication control unit 530. The communication control unit 530 which received this transmits the requested update request to the setting value management server 110. Processing that the setting value management server 110 which received the update request executes is the same as what is described in FIG. 17. The state of the device-specific setting value DB 413 is the same as in Table 13 by the above processing procedure.

As described above, by virtue of the present embodiment, in addition to the effect of the invention described in the foregoing third embodiment, it is possible to perform update processing by limiting data for making an update request to the setting value management server 110 to setting values for which the management classification is "reference only".

By this, an effect of reducing processing load and communication traffic becomes attainable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-014539 filed on Jan. 28, 2016, which is hereby incorporated by reference herein in its entirety.

What is claimed is:

1. An image processing apparatus capable of communication with an external apparatus that manages setting items of a plurality of image processing apparatuses connected to a network, the image processing apparatus comprising:
a memory device that stores a set of instructions; and
at least one processor that executes the instructions to:
inquire to the external apparatus for information as to whether or not a first database relating to setting items of the image processing apparatus exists in the external apparatus, in a case where an initial connection between the image processing apparatus and the external apparatus is performed via the network;
obtain setting values of the first database in a case where it is determined based on a result of the inquiry that the first database exists in the external apparatus;
reflect the obtained setting values to a second database held in the image processing apparatus and request to the external apparatus to update or replace information of the first database held in the external apparatus with the reflected setting values of the second database held in the image processing apparatus, and
make, in a case where it is determined based on a result of the inquiry that the first database does not exist in the external apparatus, a request to the external apparatus to newly generate the first database with setting values of the second database held in the image processing apparatus,
wherein the setting items include first setting items that can be edited in the external apparatus and second setting items that cannot be edited in the external apparatus.

2. The image processing apparatus according to claim 1, wherein the at least one processor further executes the instructions to reflect to the second database only the first setting items among the obtained setting values and maintain setting values of the second database for the second setting items, in a case where it is confirmed that the first database exists.

3. The image processing apparatus according to claim 1, wherein the at least one processor further executes the instructions to obtain from the first database setting values of only the first setting items, and
reflect to the second database the obtained setting values of the first setting items in a case where it is confirmed that the first database exists.

4. The image processing apparatus according to claim 2, wherein the at least one processor further executes the instructions to make a request to the external apparatus to update or replace information of the first database for setting values of only the second setting items of the second database in a case where it is confirmed that the first database exists.

5. The image processing apparatus according to claim 1, wherein the at least one processor further executes the instructions to cause obtainment of setting values of the first setting items of the first database and reflect to the second database the obtained setting values in a case where the first database is newly generated in the external apparatus.

6. The image processing apparatus according to claim 1, wherein the at least one processor further executes the instructions to make a request for processing to delete the already existing first database as processing for requesting to the external apparatus to update or replace information of the first database, and make a request for processing for newly generating the first database by using setting values of the second database in a case where the first database is deleted.

7. The image processing apparatus according to claim 1, wherein the at least one processor further executes the instructions to inquire to the external apparatus for information as to whether or not the first database relating to setting items of the image processing apparatus exists by using a device identifier of the image processing apparatus.

8. A method of controlling an image processing apparatus capable of communication with an external apparatus that manages setting items of a plurality of image processing apparatuses connected to a network, the method comprising:
inquiring to the external apparatus for information as to whether or not a first database relating to setting items of the image processing apparatus exists in the external apparatus, in a case where an initial connection between the image processing apparatus and the external apparatus is performed via the network;
obtaining setting values of the first database in a case where it is determined based on a result of the inquiry that the first database exists;
reflecting the obtained setting values to a second database held in the image processing apparatus and request to the external apparatus to update or replace information of the first database held in the external apparatus with the reflected setting values of the second database held in the image processing apparatus, and making, in a case where it is determined based on a result of the inquiry that the first database does not exist in the external apparatus, a request to the external apparatus to newly generate the first database with setting values of the second database held in the image processing apparatus, wherein the setting items include first setting items that can be edited in the external apparatus and second setting items that cannot be edited in the external apparatus.

9. A non-transitory computer-readable storage medium storing a computer program for causing a computer to execute a method of controlling an image processing apparatus capable of communication with an external apparatus that manages setting items of a plurality of image processing apparatuses connected to a network, the method comprising:

inquiring to the external apparatus for information as to whether or not a first database relating to setting items of the image processing apparatus exists in the external apparatus, in a case where an initial connection between the image processing apparatus and external apparatus is performed via the network;

obtaining setting values of the first database in a case where it is determined based on a result of the inquiry that the first database exists;

reflecting the obtained setting values to a second database held in the image processing apparatus and request to the external apparatus to update or replace information of the first database held in the external apparatus with the reflected setting values of the second database held in the image processing apparatus, and making, in a case where it is determined based on a result of the inquiry that the first database does not exist in the external apparatus, a request to the external apparatus to newly generate the first database with setting values of the second database held in the image processing apparatus, wherein the setting items include first setting items that can be edited in the external apparatus and second setting items that cannot be edited in the external apparatus.

* * * * *